United States Patent
Qureshi et al.

(10) Patent No.: US 12,191,917 B2
(45) Date of Patent: **\*Jan. 7, 2025**

(54) METHOD FOR MEASURING PHYSIOLOGICAL DATA WITH A BODY AREA NETWORK

(71) Applicant: KING FAHD UNIVERSITY OF PETROLEUM AND MINERALS, Dhahran (SA)

(72) Inventors: Khurram Karim Qureshi, Dhahran (SA); Jawad Ahmad, Dhahran (SA); Salman Ghafoor, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 18/802,131

(22) Filed: Aug. 13, 2024

(65) Prior Publication Data
US 2024/0405891 A1 Dec. 5, 2024

Related U.S. Application Data

(63) Continuation of application No. 17/886,150, filed on Aug. 11, 2022, now Pat. No. 12,119,886.

(51) Int. Cl.
*H04B 13/00* (2006.01)
*H04B 1/7163* (2011.01)
*H04B 10/11* (2013.01)

(52) U.S. Cl.
CPC ......... *H04B 13/005* (2013.01); *H04B 1/7163* (2013.01); *H04B 10/11* (2013.01)

(58) Field of Classification Search
None
See application file for complete search history.

(56) References Cited

U.S. PATENT DOCUMENTS

| 12,119,886 B2 * | 10/2024 | Qureshi | H04B 13/005 |
| 2007/0025738 A1 * | 2/2007 | Moore | H04B 10/1149 |
| | | | 398/189 |

(Continued)

FOREIGN PATENT DOCUMENTS

| JP | 2010233195 A | * 10/2010 |
| WO | 2021/048231 A2 | 3/2021 |

OTHER PUBLICATIONS

Majeed et al.,"3 Gb/s Broadband Spectral Amplitude Coding—Optical Code Division Multiple Access (SAC-OCDMA) Based on Multi Diagonal and Walsh Hadamard Codes", Sep. 2019, Journal of Communications vol. 14, No. 9, pp. 802-812 (Year: 2019).*

(Continued)

*Primary Examiner* — David W Lambert
(74) *Attorney, Agent, or Firm* — Oblon, McClelland, Maier & Neustadt, L.L.P.

(57) ABSTRACT

A body area network (BAN) architecture including a plurality of ultra-wideband (UWB) BAN node devices, a control node device, and a remote node device is described. The plurality of UWB BAN node devices measures real-time physiological data of a patient and transmits the physiological data to the control node device using UWB signals. The control node device encodes the UWB signals using an spectral amplitude coding-optical code division multiple access (SAC-OCDMA) encoder, modulates the encoded UWB signals using an on-off keying (OOK) scheme, combines the modulated UWB signals into an optical signal using an optical coupler, and transmits the combined optical signal through a free space optical (FSO) link to the remote node device. The remote node device decodes the combined optical signal using an SAC-OCDMA decoder, converts the decoded optical signal into an electrical signal, and analyzes the physiological data based on the electrical signal.

10 Claims, 18 Drawing Sheets

(56) References Cited

U.S. PATENT DOCUMENTS

2010/0202494 A1    8/2010  Roh et al.
2013/0030259 A1*  1/2013  Thomsen ............. A61B 5/4824
                                                        600/301
2017/0155427 A1*  6/2017  Hasan ...................... H04B 5/72

OTHER PUBLICATIONS

Wu, Zheng-Xun et al.; "Optical Interference Cancellations with Recursive Correlation Subtractions on Bio-Inspired Signals Transmission", Institute of Computer & Communication Engineering; Feb. 14, 2017.

* cited by examiner

METHOD FOR MEASURING PHYSIOLOGICAL DATA WITH A BODY AREA NETWORK

CROSS-REFERENCE TO RELATED APPLICATIONS

The present application is a Continuation of U.S. application Ser. No. 17/886,150, now allowed, having a filing date of Aug. 11, 2022.

STATEMENT REGARDING PRIOR DISCLOSURE BY INVENTORS

Aspects of the present disclosure were described in Jawad Mirza, Salman Ghafoor, Waqas Ahmad, Ahmad Salman, and Khurram Karim Qureshi, "Integrating ultra-wideband and free space optical communication for realizing a secure and high-throughput body area network architecture based on optical code division multiple access" published in Optical Review, vol. 28, pp. 525-537, 2021.

BACKGROUND

Technical Field

The present disclosure is directed to systems and methods for integrating ultra-wideband (UWB) and free space optical (FSO) communications for realizing a secure and high-throughput body area network (BAN) architecture based on optical code division multiple access (OCDMA).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A body area network (BAN) is a wireless technology operating at a close proximity to a human body (for example, a patient) which enables wireless communications between on-body sensors (also referred to as BAN nodes) and a control node usually mounted or attached to the human body or located at a predefined distance near to the human body. In an example, the control node may act as a coordinator establishing a communication link with all the BAN nodes as well as with other wireless or wired networks.

In an example, the BAN may be used in telemedicine and e-health platforms. For example, the BAN may provide continuous remote monitoring of patients having one or more diseases. Such continuous monitoring may assist in early detection of abnormal health conditions. By timely detection of abnormal health conditions, the BAN can prevent diseases and thus allow reducing healthcare expenditure which is a significant challenge nowadays due to the increasing percentage of the aging population. Also, the workload of medical staff can be decreased by integrating the BAN with medical centers. This will result in a higher efficiency of medical staff and a reduction in the healthcare expenditure. While designing the BAN, a network designer should choose such a wireless technology that promises a high capacity of information transmission between BAN nodes and control nodes along with low power spectral density (PSD). Recent studies show that electromagnetic interference (EMI) between radio frequency (RF) devices and medical equipments, such as the medical equipment in hospitals, can be critical. Moreover, prolonged RF exposure to patients is undesirable. Therefore, it is imperative to use BAN nodes with minimum transmit power on the patients so that the adverse effects of RF exposure to the patients, and EMI between RF devices and medical equipments, can be mitigated.

Ultra-wideband (UWB) is an attractive and promising wireless communication technique that provides carrier-less, high data rate transmission. Due to very low-radiated power which is equal to −41.3 dBm/MHz, the UWB can be a potential candidate in the BAN technology which can resolve the issues of adverse effects of RF exposure to the patients, and EMI between RF devices and medical equipments. Accordingly, the BAN should have the features of high data rate, immunity to EMI, environment-friendly, license-free spectrum, low installation, and maintenance costs. In an aspect, realization of these characteristics of BAN by employing free space optics (FSO) technology transforms the BAN into optical body area networks (OBANs). Further, FSO communications can transmit high capacity wireless signals while maintaining cost-efficiency due to reduced deployment costs. Furthermore, a large license-free spectrum is offered by FSO that is immune to EMI, is environment friendly, and is more secure than RF links. Owing to these desirable features, FSO-based OBANs are the future of BANs. However, the FSO technology is not completely free of interception. For example, an external eavesdropper can extract information by using a wiretapper-like arrangement hidden close to a main receiver. Similarly, a receiver can be placed in the divergence region of a received optical beam whose spot size is significantly larger than the receiver size as a consequence of the beam spreading through the atmosphere. Therefore, a secure communication system needs to be implemented for the transmission of BAN signals.

Accordingly, it is one object of the present disclosure to provide systems and methods for integrating UWB and FSO communications for realizing a secure and high-throughput BAN architecture.

SUMMARY

In an exemplary embodiment, a body area network (BAN) architecture is disclosed. The BAN architecture includes a plurality of ultra-wideband (UWB) BAN node devices configured to measure real-time physiological data of a patient and to transmit the physiological data using UWB signals. The BAN architecture further includes a control node device configured to receive the UWB signals transmitted from the plurality of UWB BAN node devices, encode the UWB signals using a spectral amplitude coding-optical code division multiple access (SAC-OCDMA) encoder, modulate the encoded UWB signals using an on-off keying (OOK) scheme, combine the modulated UWB signals into an optical signal using an optical coupler, and transmit the combined optical signal through a free space optics (FSO) link. Further, the BAN architecture includes a remote node device configured to receive the combined optical signal transmitted from the control node device, decode the combined optical signal using an SAC-OCDMA decoder, convert the decoded optical signal into an electrical signal, and analyze the physiological data of the patient based on the electrical signal.

In another exemplary embodiment, a method for a body area network (BAN) architecture including a plurality of ultra-wideband (UWB) BAN node devices, a control node device, and a remote node device is disclosed. The method includes measuring, by the plurality of UWB BAN node devices, real-time physiological data of a patient. The method further includes transmitting, from the plurality of UWB BAN node devices to the control node device, the physiological data using UWB signals. The method also includes encoding, by the control node device, the UWB signals using a spectral amplitude coding-optical code division multiple access (SAC-OCDMA) encoder. Further, the method includes modulating, by the control node device, the encoded UWB signals using an on-off keying (OOK) scheme, and combining, by the control node device, the modulated UWB signals into an optical signal using an optical coupler. The method includes transmitting, from the control node device to the remote node device, the combined optical signal through a free space optics (FSO) link. Further, the method includes decoding, by the remote node device, the combined optical signal using an SAC-OCDMA decoder, converting, by the remote node device, the decoded optical signal into an electrical signal, and analyzing, by the remote node device, the physiological data of the patient based on the electrical signal.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
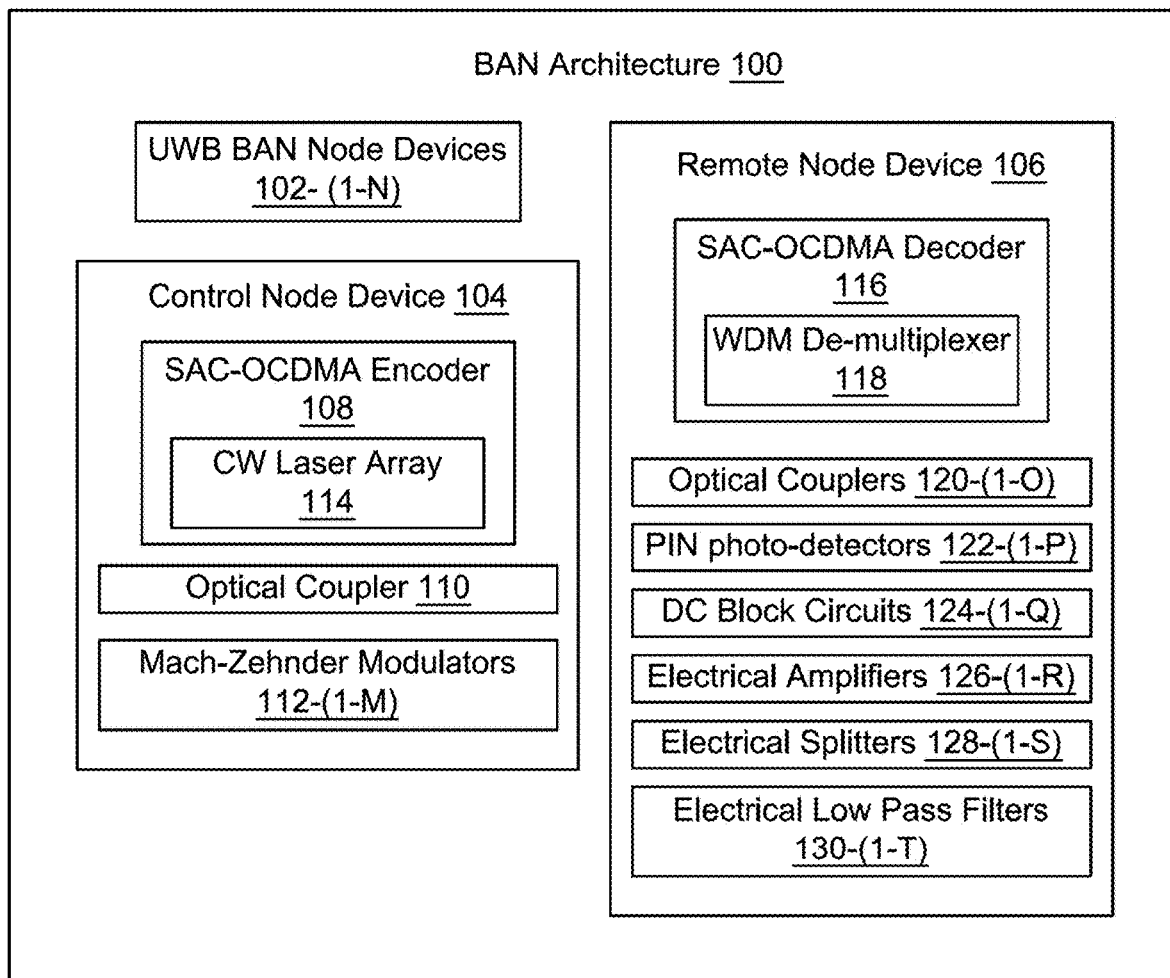
FIG. 1A depicts a block diagram of a body area network (BAN) architecture, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to systems and methods for integrating ultra-wideband (UWB) and free space optical (FSO) communication for realizing a secure and high-throughput body area network (BAN) architecture based on optical code division multiple access (OCDMA).

Nodes in a BAN are miniature wearable or implantable battery-powered wireless sensors which continuously transmit real-time vital physiological data of a human body (for example, a patient) to a remote healthcare center while remaining in close proximity to the human body. Therefore, BAN nodes should have the features of high data rates and low transmit powers to protect the human body, environment, and biomedical equipment from harmful exposure to electromagnetic radiation and EMI. In an example, UWB signals have low allowable transmission power and high data rates.

The present disclosure presents a low transmit power, low cost, and secure optical body area network (OBAN) composed of a plurality of UWB BAN nodes.

FIG. 1A depicts a block diagram of a BAN architecture 100, according to aspects of the present disclosure.

According to an embodiment, the BAN architecture 100 includes a plurality of ultra-wideband (UWB) BAN node devices 102-(1-N), a control node device 104, and a remote node device 106. In an example, the remote node device 106 may be a remote healthcare center. The control node device 104 may further include a spectral amplitude coding-optical code division multiple access (SAC-OCDMA) encoder 108, an optical coupler 110, and a plurality of Mach-Zehnder modulators (MZMs) 112-(1-M). A Mach-Zehnder modulator is a device that is used for controlling the amplitude of an optical wave.

Further, the SAC-OCDMA encoder 108 includes a continuous wave (CW) laser array 114. The remote node device 106 may include an SAC-OCDMA decoder 116. The SAC-OCDMA decoder 116 may include a wavelength division multiplexing (WDM) de-multiplexer 118. The remote node device 106 may also include a plurality of optical couplers 120-(1-O), a plurality of positive-intrinsic-negative (PIN) photo-detectors 122-(1-P), a plurality of direct current (DC) block circuits 124-(1-Q), a plurality of electrical amplifiers 126-(1-R), a plurality of electrical splitters 128-(1-S), and a plurality of electrical low pass filters 130-(1-T). An optical coupler is a semiconductor device, which is designed to transfer electrical signals by using light waves in order to provide coupling with electrical isolation between circuits or systems. Examples of optical couplers include splitters, combiners, X-couplers, etc. A PIN photodetector is a photodiode with a wide intrinsic semiconductor region in between the p-type and n-type semiconductor regions. A DC blocking circuit is a circuit that prevent the flow of DC signals into systems while allowing higher frequency RF signals to pass through. An electrical amplifier is a device that can increase the power of a signal (a time-varying voltage or current). An electrical low pass filter is a filter that passes signals with a frequency lower than a selected cutoff frequency and attenuates signals with frequencies higher than the cutoff frequency.

Figure 1B:
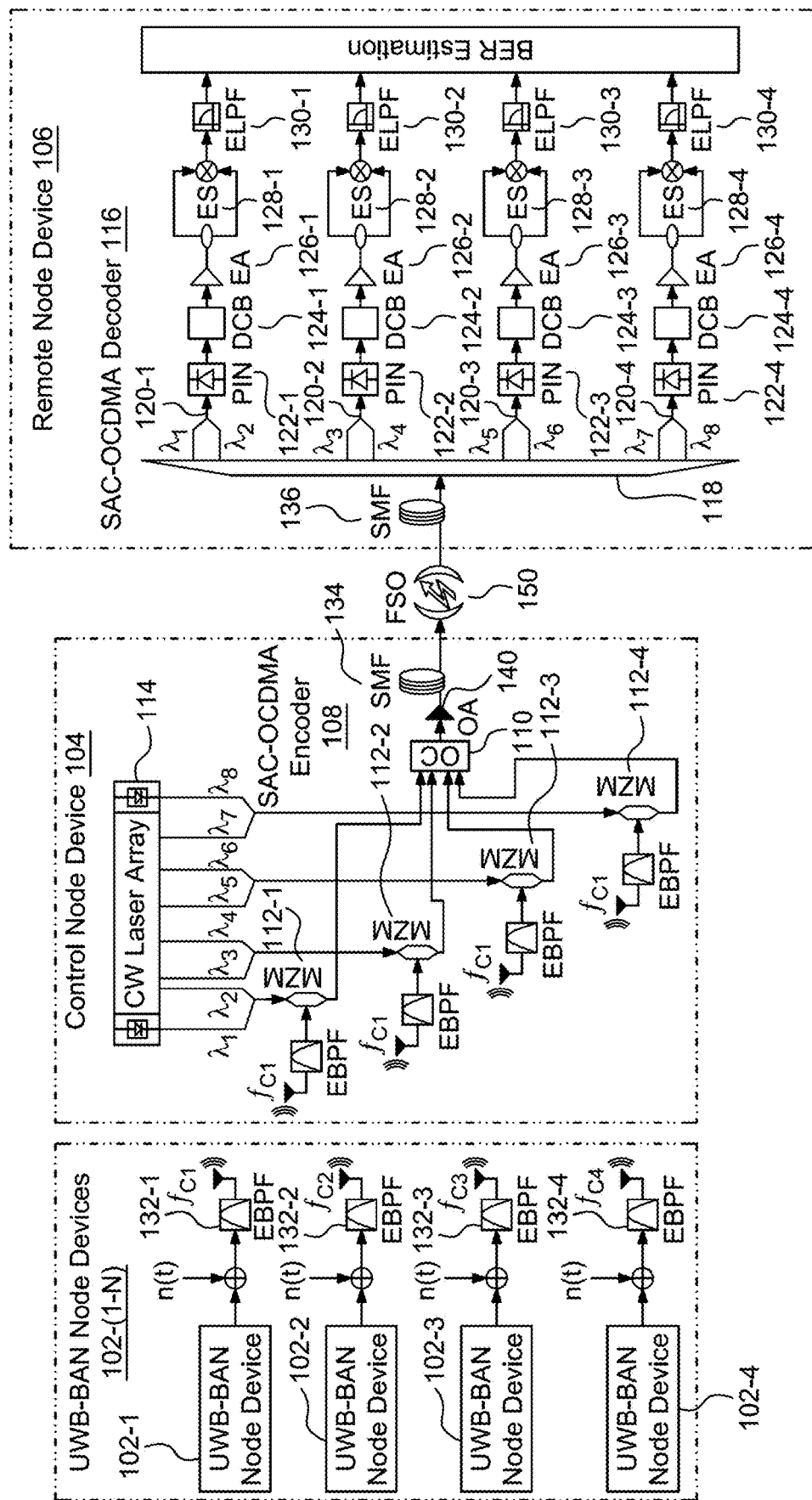
FIG. 1B depicts the BAN architecture in greater detail, according to aspects of the present disclosure.

FIG. 1B depicts a detailed example of the BAN architecture 100, according to aspects of the present disclosure.

According to an aspect, the plurality of ultra-wideband (UWB) BAN node devices 102-(1-N) may be a close proximity to a patient and configured to measure real-time physiological data of the patient, such as pulse rate, body temperature, electrocardiogram (ECG), and electroencephalogram (EEG) activity. For example, the plurality of UWB BAN node devices 102-(1-N) can be disposed or mounted on (or attached to) human body (or clothes) of the patient.

For ease of explanation and understanding, description provided is with reference to one patient, however, the description is equally applicable to multiple patients. In an example, the plurality of UWB BAN node devices 102-(1-N) may include at least four UWB BAN node devices. As shown in FIG. 1B, the four UWB BAN node devices include a first UWB BAN node device 102-1, a second UWB BAN node device 102-2, a third UWB BAN node device 102-3, and a fourth UWB BAN node device 102-4. Further, the plurality of UWB BAN node devices 102-(1-N) may include a plurality of electrical bandpass filters (EBPFs). In an example, the first UWB BAN node device 102-1 may include a first EBPF 132-1, the second UWB BAN node device 102-2 may include a second EBPF 132-2, the third UWB BAN node device 102-3 may include a third EBPF 132-3, and the fourth UWB BAN node device 102-4 may include a fourth EBPF 132-4. In an example, the first EBPF 132-1, the second EBPF 132-2, the third EBPF 132-3, and the fourth EBPF 132-4 are centered at $f_{C1}$=4 GHz, $f_{C2}$=4.5 GHZ, $f_{C3}$=5 GHz, and $f_{C4}$=5.5 GHz, respectively. According to an aspect, the BAN architecture 100 may include any number of UWB BAN node devices and EBPFs.

In an aspect, the plurality of UWB BAN node devices 102-(1-N) may transmit the physiological data to the control node device 104 using UWB signals. In an example, each of the UWB signals may operate at a different carrier frequency. In an example, each of the plurality of UWB BAN node devices 102-(1-N) may transmit the physiological data over an additive white Gaussian noise (AWGN) wireless channel at a data rate of 30 Mbps in the form of Federal Communications Commission (FCC)-compliant UWB mono-cycle pulses which are generated by taking a first-order derivative of electrical Gaussian pulses. Further, each of the plurality of UWB BAN node devices 102-(1-N) may transmit at a different radio frequency to avoid interference at the control node device 104.

Figure 2A:
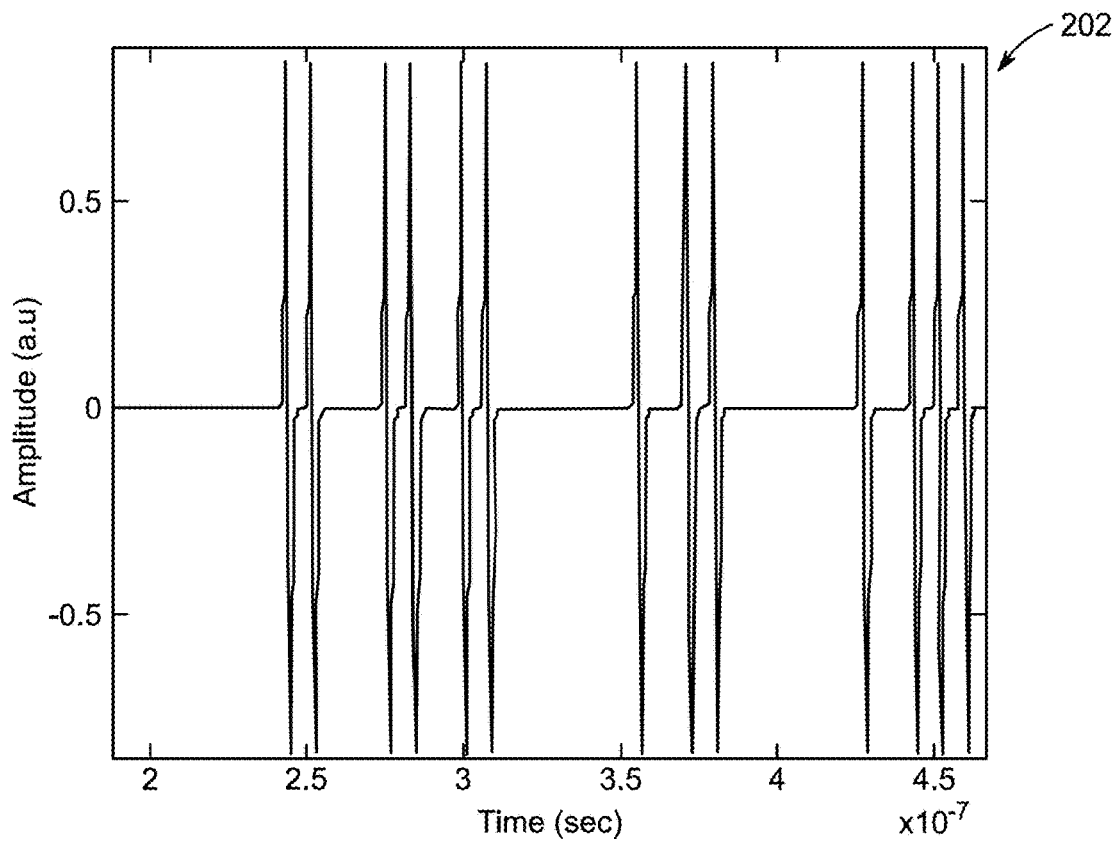
FIG. 2A depicts a time-domain plot of ultra-wideband (UWB) mono-cycle pulses generated by a first UWB BAN node device, according to aspects of the present disclosure.
Figure 2B:
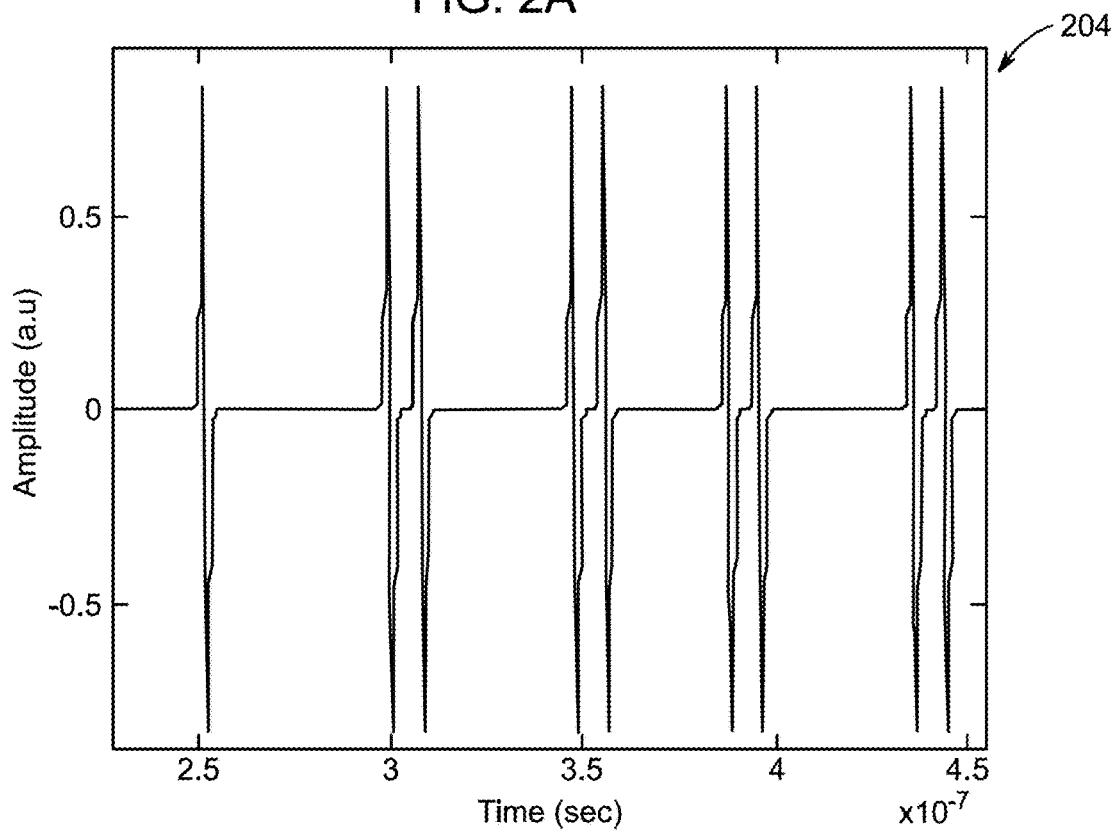
FIG. 2B depicts a time-domain plot of UWB mono-cycle pulses generated by a second UWB BAN node device, according to aspects of the present disclosure.
Figure 2C:
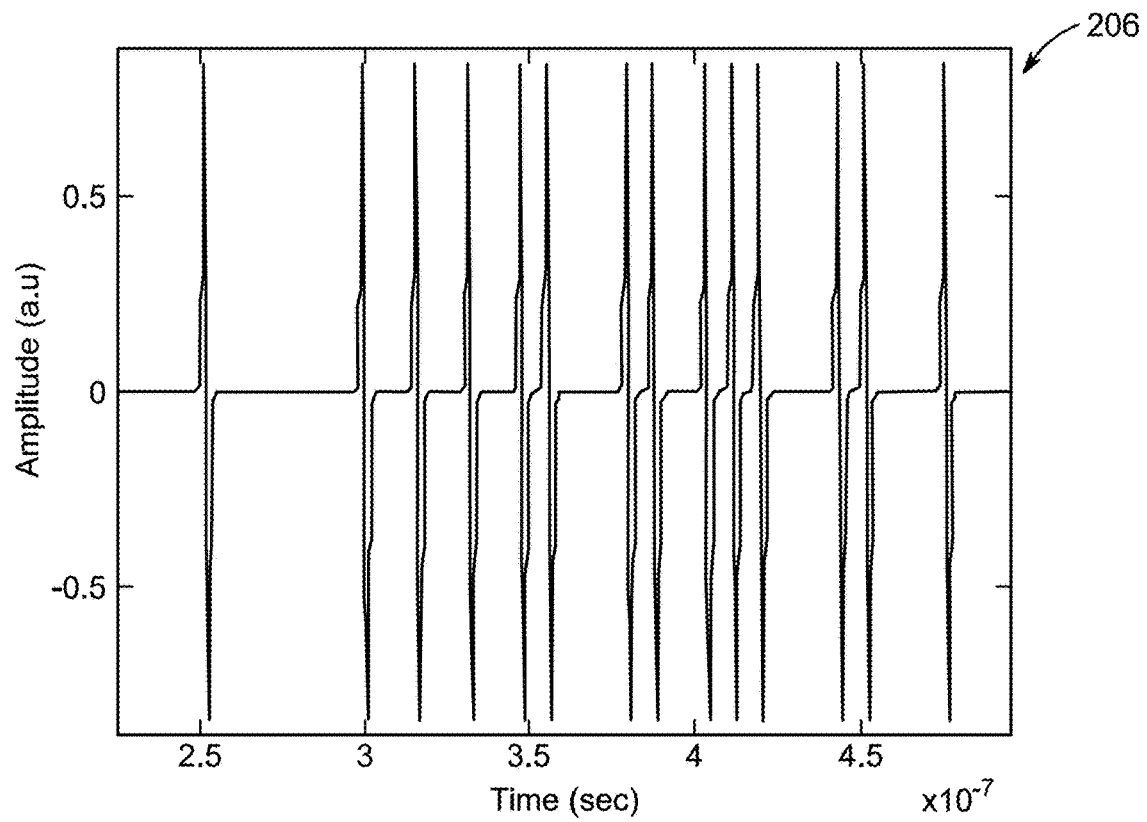
FIG. 2C depicts a time-domain plot of UWB mono-cycle pulses generated by a third UWB BAN node device, according to aspects of the present disclosure.
Figure 2D:
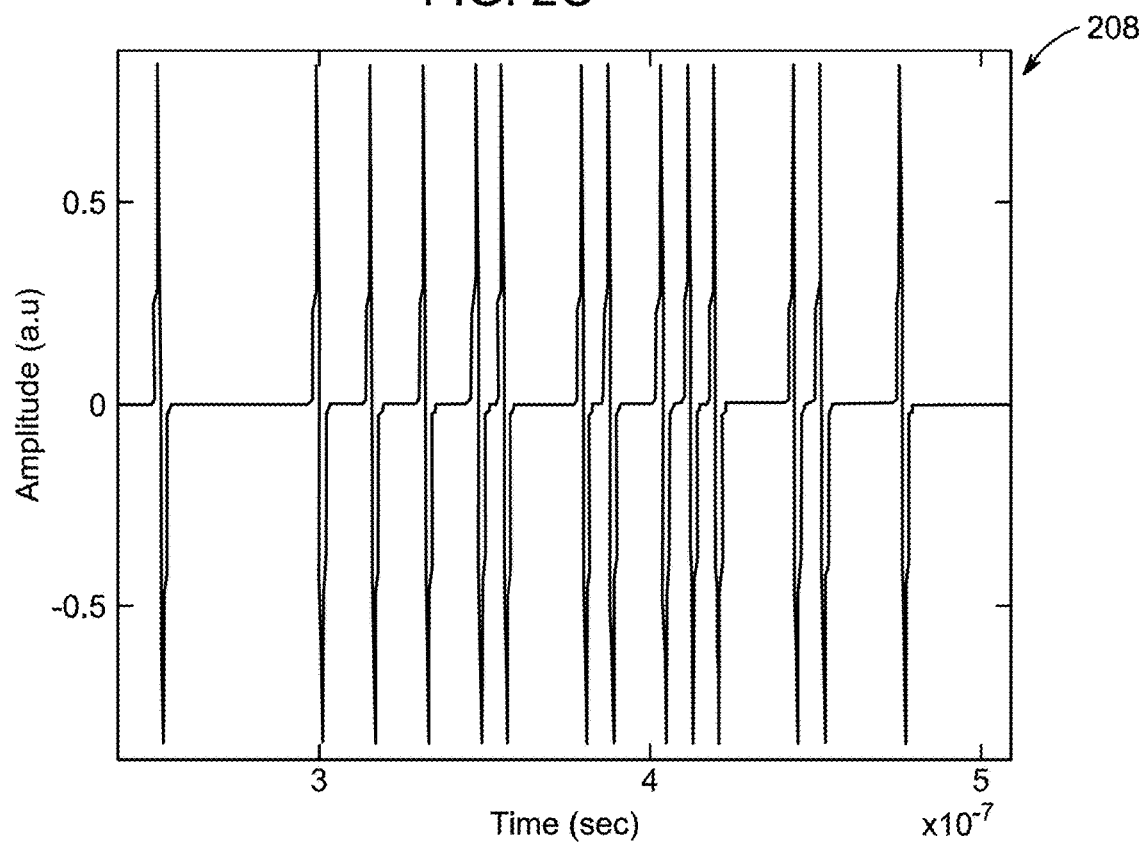
FIG. 2D depicts a time-domain plot of UWB mono-cycle pulses generated by a fourth UWB BAN node device, according to aspects of the present disclosure.

According to an aspect, to simulate the effect of the AWGN wireless channel on the transmitted UWB signals, a white noise source represented by n(t) following normal distribution is coupled with each UWB BAN node device, as shown in FIG. 1B. The time-domain plots of UWB mono-cycle pulses generated by the UWB BAN nodes devices are shown in FIGS. 2A-2D. In particular, FIG. 2A depicts time-domain plot 202 of UWB mono-cycle pulses generated by the first UWB BAN node device 102-1. FIG. 2B depicts time-domain plot 204 of UWB mono-cycle pulses generated by the second UWB BAN node device 102-2. FIG. 2C depicts time-domain plot 206 of UWB mono-cycle pulses generated by the third UWB BAN node device 102-3. FIG. 2D depicts time-domain plot 208 of UWB mono-cycle pulses generated by the fourth UWB BAN node device 102-4.

Figure 3A:
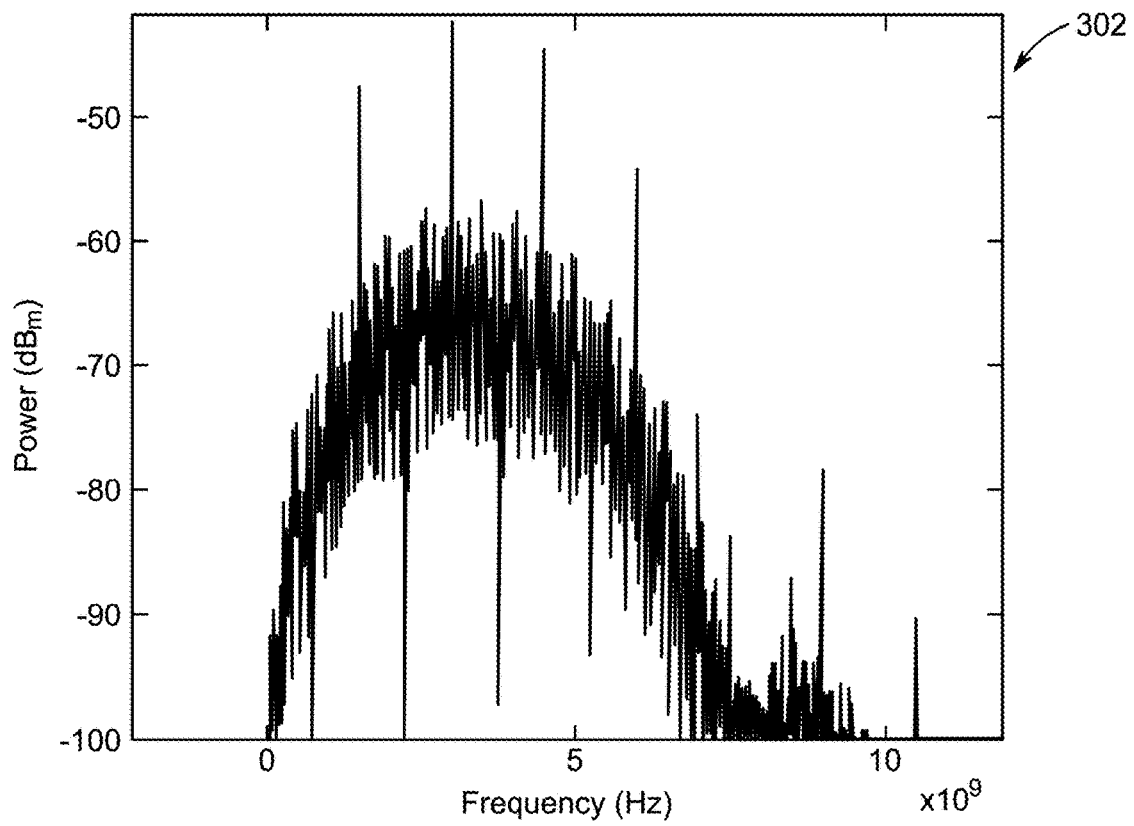
FIG. 3A depicts a frequency-domain plot of UWB mono-cycle pulses generated by the first UWB BAN node device, according to aspects of the present disclosure.
Figure 3B:
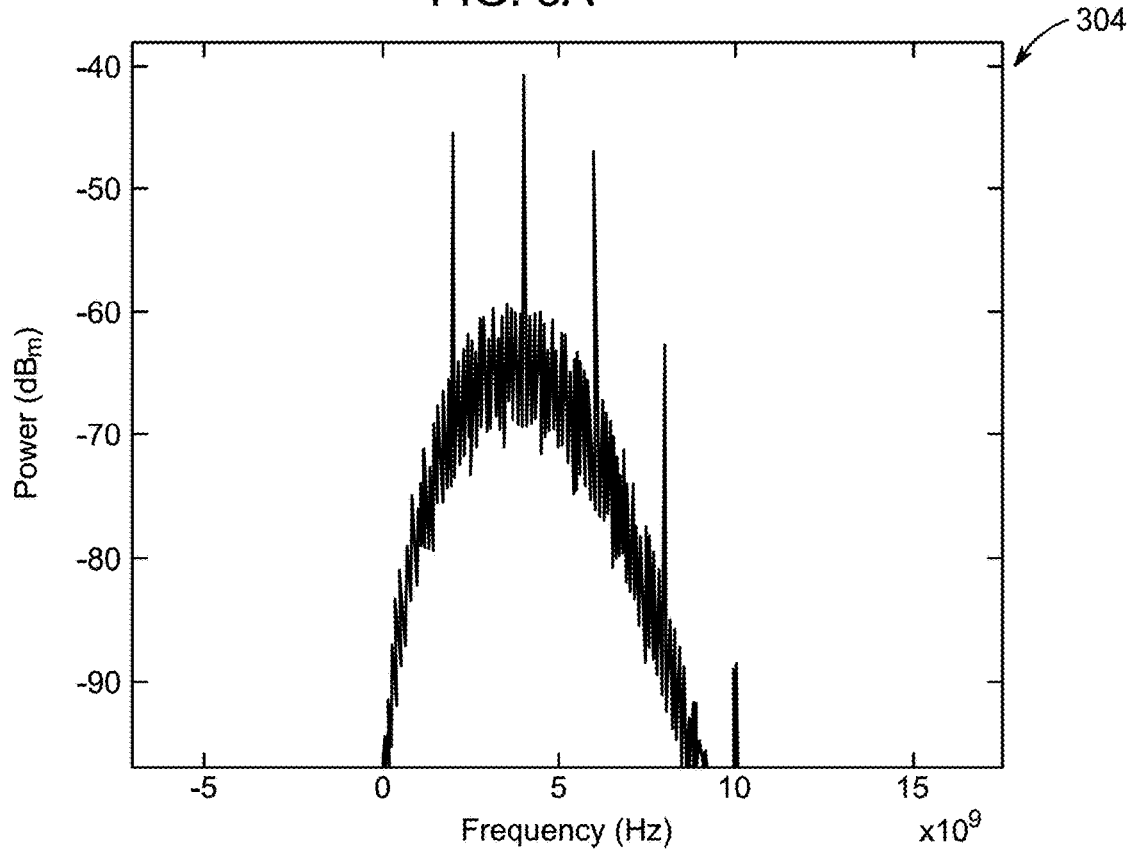
FIG. 3B depicts a frequency-domain plot of UWB mono-cycle pulses generated by the second UWB BAN node device, according to aspects of the present disclosure.
Figure 3C:
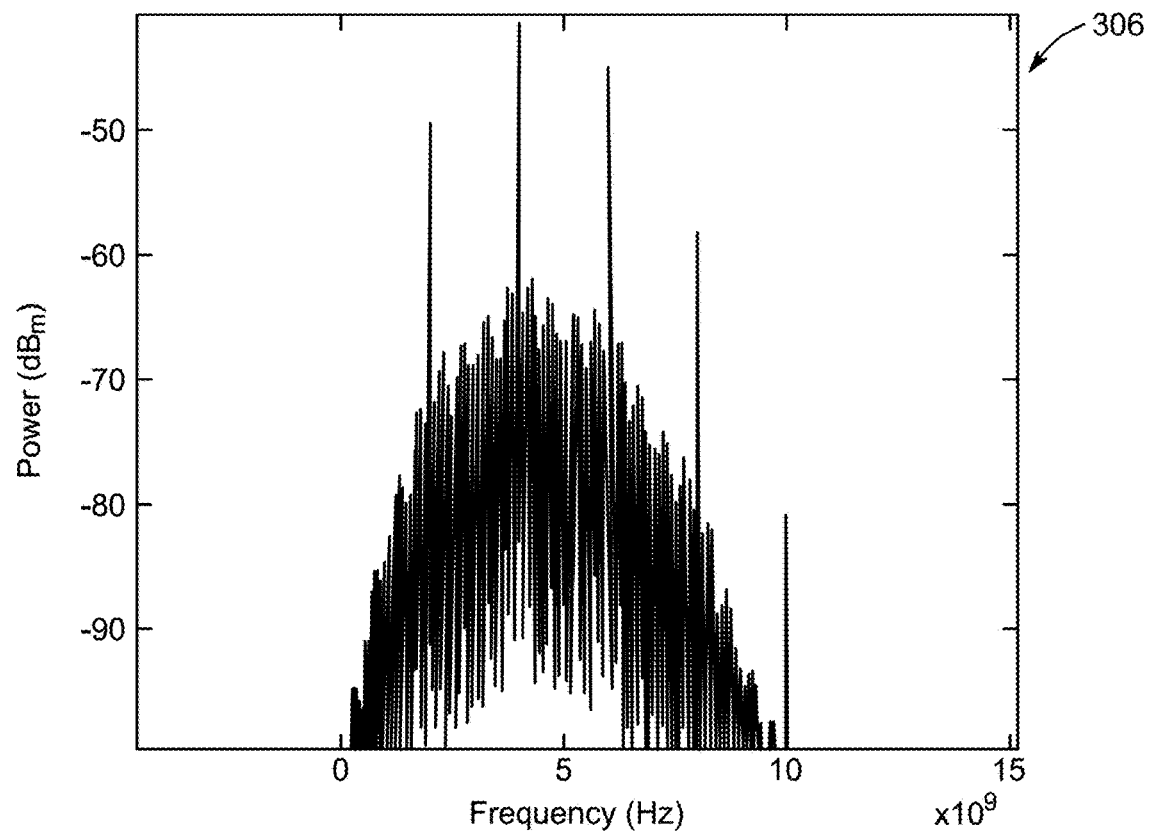
FIG. 3C depicts a frequency-domain plot of UWB mono-cycle pulses generated by the third UWB BAN node device, according to aspects of the present disclosure.
Figure 3D:
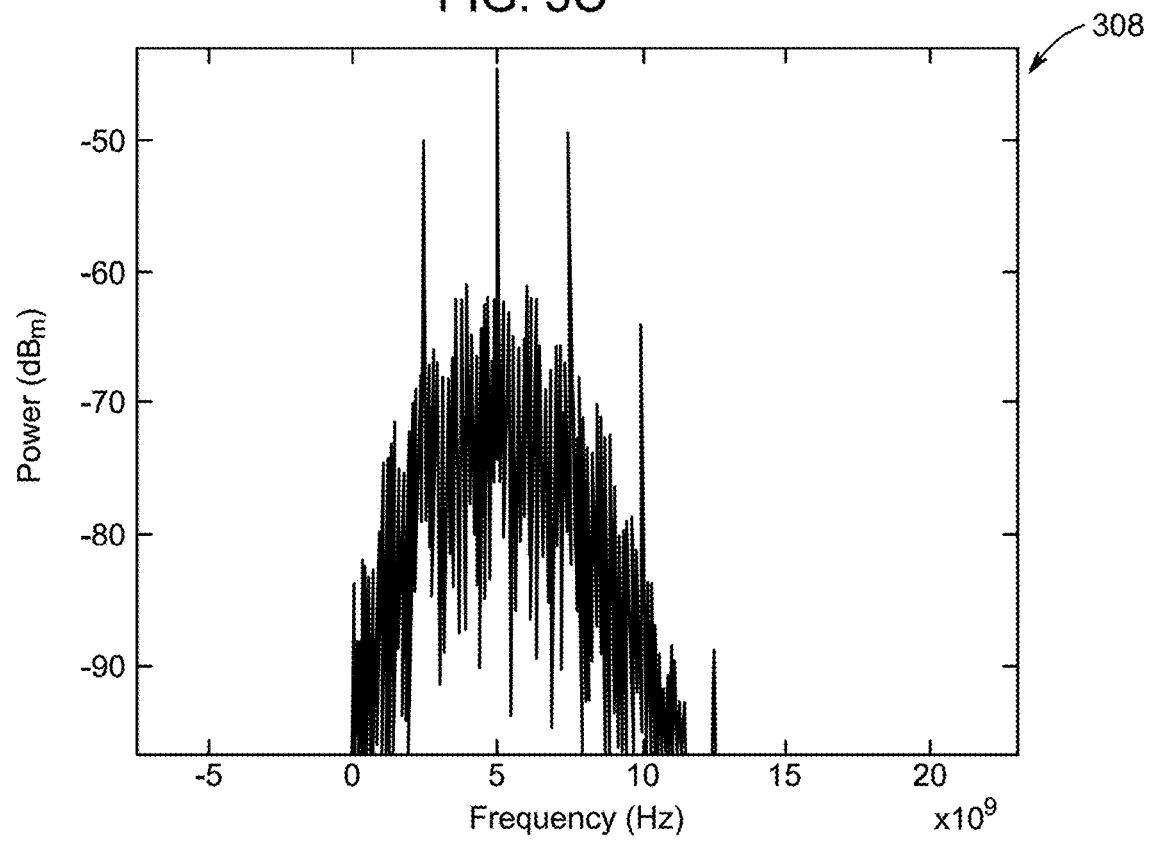
FIG. 3D depicts a frequency-domain plot of UWB mono-cycle pulses generated by the fourth UWB BAN node device, according to aspects of the present disclosure.

Further, the frequency-domain plots (or spectral plots) of UWB mono-cycle pulses generated by the UWB BAN node devices are shown in FIGS. 3A-3D. In particular, FIG. 3A depicts a frequency-domain plot 302 of UWB mono-cycle pulses generated by the first UWB BAN node device 102-1. FIG. 3B depicts a frequency-domain plot 304 of UWB mono-cycle pulses generated by the second UWB BAN node device 102-2. FIG. 3C depicts a frequency-domain plot 306 of UWB mono-cycle pulses generated by the third UWB BAN node device 102-3. FIG. 3D depicts a frequency-domain plot 308 of UWB mono-cycle pulses generated by the fourth UWB BAN node device 102-4.

Figure 4:
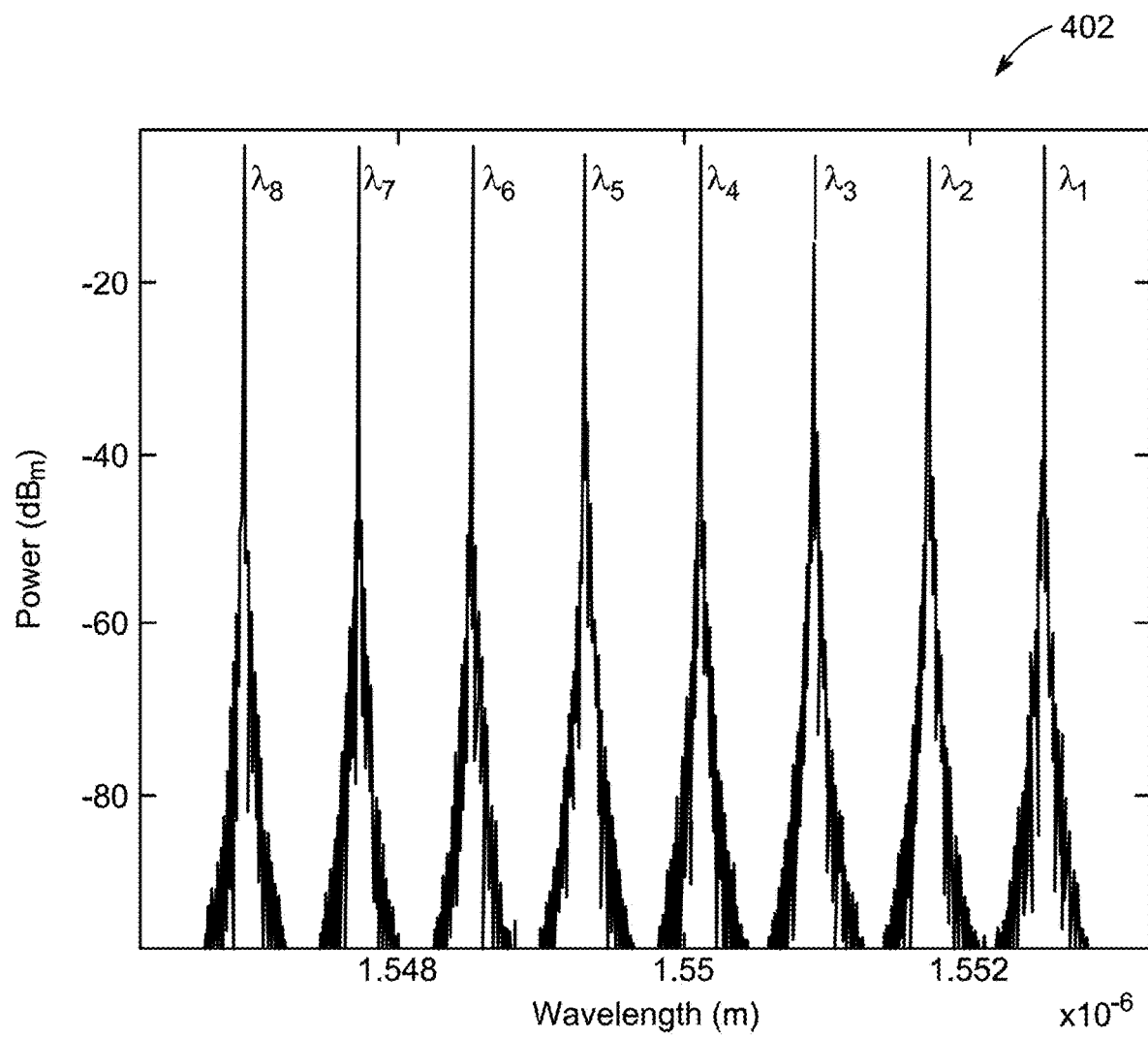
FIG. 4 depicts a spectrum generated by a continuous wave (CW) laser array, according to aspects of the present disclosure.

Referring back to FIG. 1B, according to an aspect, the control node device 104 may receive the UWB signals transmitted from the plurality of UWB BAN node devices 102-(1-N). Due to channel-induced impairments, the received UWB signals at the control node device 104 may be distorted. According to an aspect, upon receiving the UWB signals, the control node device 104 may encode the UWB signals using the SAC-OCDMA encoder 108. The CW laser array 114 of the SAC-OCDMA encoder 108 may generate multiple wavelengths that may be used to encode the UWB signals. In an example, CW laser array 114 may generate two wavelengths for each of the UWB signals. Accordingly, for the first UWB BAN node device 102-1, the second UWB BAN node device 102-2, the third UWB BAN node device 102-3, and the fourth UWB BAN node device 102-4, CW laser array 114 may generate total eight wavelengths at the same power level at its output port. In an example, these eight wavelengths are centered at $\lambda_1=1552.524$ nm, $\lambda_2=1551.720$ nm, $\lambda_3=1550.918$ nm, $\lambda_4=1550.116$ nm, $\lambda_5=1549.315$ nm, $\lambda_6=1548.514$ nm, $\lambda_7=1547.715$ nm, and $\lambda_8=1546.916$ nm. A combined spectrum 400 of the eight wavelengths generated through the CW laser array 114 is shown in FIG. 4.

According to an aspect, the control node device 104 may modulate the encoded UWB signals using an on-off keying (OOK) scheme. In an aspect, the control node device 104 may modulate the encoded UWB signals using the plurality of MZMs 112-(1-M). In an example, the plurality of MZMs 112-(1-M) may include at least four MZMs. As shown in FIG. 1B, the four MZMs include a first MZM 112-1, a second MZM 112-2, a third MZM 112-3, and a fourth MZM 112-4. According to an aspect, the BAN architecture 100 may include any number of MZMs.

The control node device 104 may combine the modulated UWB signals into an optical signal using the optical coupler 110. The control node device 104 may combine the modulated UWB signals into the optical signal based on a double-weight zero cross-correlation (DW-ZCC) code scheme for example. Since the CW laser array 114 generates eight distinct wavelengths that are 0.8 nm apart for example, therefore, the optical coupler 110 can be used as an encoder to combine the specific wavelength in reference to the DW-ZCC code scheme. For example, for the first UWB BAN node device 102-1, $\lambda_1=1552.524$ nm and $\lambda_2=1551.720$ nm are combined to translate the binary "1s" in the DW-ZCC code scheme into spectral representation, as shown in Table 1 (described later). After the encoding process, each "1" in the patient's physiological data is represented by a combination of two carriers centered as per the DW-ZCC code scheme. Consequently, the efficiency of the BAN architecture 100 is increased with added benefits of built-in security to eavesdropping. In the same way, the UWB signals from the second UWB BAN node device 102-2, the third UWB BAN node device 102-3, and the fourth UWB BAN node device 102-4 are encoded using the DW-ZCC code scheme and then modulated with their respective patient physiological data signals as described earlier for the first UWB BAN node device 102-1. The full-width at half-maximum (FWHM) of the UWB mono-cycle pulses of each UWB BAN node device at the output of the MZMs after the OOK modulation is around 125 ps. All four encoded optical signals after the OOK modulation are combined using the optical coupler 110, as shown in FIG. 1B.

The DW-ZCC code scheme is developed by considering three performance parameters of DW-ZCC which include code length (L), hamming weight (W), and cross-correlation ($C_{max}$) between the adjacent codes represented by X and Y. The cross-correlation can be defined mathematically using Equation (1) provided below.

$$C_{max} = \sum_{i=1}^{L} x_i y_i = 0. \quad (1)$$

In Equation (1), X and Y are two adjacent code words, where $X=x_1, x_2 \ldots x_L$ and $Y=y_1, y_2 \ldots y_L$. Also, $x_i$ and $y_i$ are bit values of respective code sequences.

The basic matrix with U code sequences of length L can be mathematically represented as Equation (2).

$$Z_B = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}_{U \times L}, \quad (2)$$

where U represents the number of nodes.

From the basic matrix $Z_B$, a large number of nodes can be accommodated using a simple mapping technique, such as Equation (3).

$$Z_B = \begin{bmatrix} Z_B & 0 \\ 0 & Z_B \end{bmatrix}_{8 \times 16}. \quad (3)$$

Table 1 shows the DW-ZCC code scheme with U=4 and W=2, where PoS represent the position of "1" in each code sequence. The DW-ZCC code scheme is constructed with a reduced weight (W=2) to decrease the number of filters and evaluate the feasibility of the BAN architecture 100 in terms of implementational complexity and cost. In addition, a highly acknowledged direct detection technique can be used to recover the intended spectrum with desired correlation properties, thereby eliminating the need for an extra arrangement in the SAC-OCDMA encoder 108.

It can be observed that there are no overlapping bits between the adjacent codes and throughout the $Z_B$ code matrix. Moreover, the association of the number of nodes and weight yields the total code length as Lt=U×L. For ease of representation, the first UWB BAN node device 102-1, the second UWB BAN node device 102-2, the third UWB BAN node device 102-3, and the fourth UWB BAN node device 102-4 are abbreviated to Node #1, Node #2, Node #3, and Node #4, respectively, in Table 1.

TABLE 1

DW-ZCC code scheme (U = 4, W = 2)

| Nodes | $\lambda_1$ | $\lambda_2$ | $\lambda_3$ | $\lambda_4$ | $\lambda_5$ | $\lambda_6$ | $\lambda_7$ | $\lambda_8$ | Positions |
|---|---|---|---|---|---|---|---|---|---|
| Node#1 | 1 | 1 | 0 | 0 | 0 | 0 | 0 | 0 | $PoS_1 = [1, 2]$ |
| Node#2 | 0 | 0 | 1 | 1 | 0 | 0 | 0 | 0 | $PoS_1 = [3, 4]$ |
| Node#3 | 0 | 0 | 0 | 0 | 1 | 1 | 0 | 0 | $PoS_1 = [5, 6]$ |
| Node#4 | 0 | 0 | 0 | 0 | 0 | 0 | 1 | 1 | $PoS_1 = [7, 8]$ |

To determine an efficient structure of the SAC-OCDMA encoder 108, and to recover the intended spectrum with desired correlation properties, the correlation between code sequences of the DW-ZCC code scheme may be observed. It is evident from Table 1 that no overlapping bits exist between the codes. Therefore, correlation properties for the DW-ZCC code scheme can be mathematically represented by Equation (4) provided below.

$$C_{max} = \sum_{i=1}^{L} Z_x(i) Z_y(i) = \{W; x = y, 0; x \neq y\}, \quad (4)$$

where, $Z_x(i)$ and $Z_y(i)$ denote the $i^{th}$ element of the X and Y code sequences, respectively. It can be observed that zero cross-correlation exists between code sequences of the DW-ZCC code scheme. Therefore, direct detection can be adapted to recover the intended spectrum with maximum auto and minimum cross-correlation. In addition, the position of "1s" in the DW-ZCC code scheme exists in pairs, significantly simplifying the implementation of the SAC-OCDMA encoder 108 along with the allocation of the desired spectrum.

According to an aspect, the control node device 104 may include an optical amplifier (OA) 140 which amplifies the combined optical signal output from the optical coupler 110. The amplified combined optical signal can be transmitted to the remote node device 106 through a free space optics (FSO) link 150. In an example, the FSO link 150 may be of 0.5 km length. In some aspects, the control node device 104 may transmit the amplified combined optical signal to the remote node device 106 by a transmitter telescope (not shown). In an example, the total power radiated by the transmitter telescope in free space is around 30 dBm. In an example, the transmitter telescope may be connected to the control node device 104 through a single-mode fiber (SMF) 134. In an example, the SMF 134 may have a length of 3.5 m.

In an aspect, the remote node device 106 may be configured to receive the amplified combined optical signal transmitted from the control node device 104. The amplified combined optical signal can be received by a receiver telescope (not shown). In an example, the receiver telescope may be connected to the remote node device 106 through an SMF 136. In an example, the SMF 136 may have a length of 3.5 m. The transmitter and receiver telescopes may have parameters similar to the commercial model #M1-10GE, manufactured by FSO Artolink as 10 shown in Table 2.

TABLE 2

Parameters of the transmitter and receiver telescopes (Model# M1-10GE, Manufactured by FSO Artolink)

| Sr. No | Parameters | Values |
|---|---|---|
| 1 | Diameter of transmitter telescope | 5 cm |
| 2 | Diameter of receiver telescope | 20 cm |
| 3 | Transmitter telescope aperture | 1 |
| 4 | Receiver telescope aperture | 1 |
| 5 | Material | GRIN lens |
| 6 | Maximum transmission speed | 1.5 Gbps |
| 7 | Operating wavelength | 1550 nm |
| 8 | Maximum working distance | 2 km |

The amplified combined optical signal may be impaired by turbulence and attenuation from the atmosphere. According to an aspect, a Log-normal channel model may be used to model the atmospheric turbulence between the control node device 104 and the remote node device 106. The Log-normal channel model may be generally implemented for clear sky FSO links, where the turbulence is weak. In an example, the values of the refractive index structure parameter and atmospheric attenuation used are chosen as $5 \times 10^{-16}$ and 5 dB/km, respectively. The Log-normal channel model is described in greater detail later in the disclosure.

Further, the remote node device 106 may be configured to decode the amplified combined optical signal using the SAC-OCDMA decoder 116. The amplified combined optical signal can be input to SAC-OCDMA decoder 116 through the SMF 136. In an example, the WDM de-multiplexer 118 may de-multiplex the amplified combined optical signal into a plurality of de-multiplexed optical signals, such as $\lambda_1$-$\lambda_8$ in FIG. 1B. The plurality of de-multiplexed optical signals is input to the plurality of optical couplers 120-(1-O). Each optical coupler of plurality of optical couplers 120-(1-O) may be associated with a respective one of the UWB signals and may be configured to combine wavelengths of the de-multiplexed optical signal corresponding to the respective one of the UWB signals. For example, as shown in FIG. 1B, $\lambda_1$ and $\lambda_2$ are combined by a first optical coupler 120-1 and input to a first PIN photo-detector 122-1, $\lambda_3$ and $\lambda_4$ are combined by a second optical coupler 120-2 and input to a second PIN photo-detector 122-2, $\lambda_5$ and $\lambda_6$ are combined by a third optical coupler 120-3 and input to a third PIN photo-detector 122-3, and $\lambda_7$ and $\lambda_8$ are combined by a fourth optical coupler 120-4 and input to a fourth PIN photo-detector 122-4.

In an aspect, since the DWZCC code scheme has zero cross-correlation between adjacent codes, therefore, the highly acknowledged direct detection scheme can be adapted to recover the intended spectrum. The filter arrangement in the WDM de-multiplexer 118 may be utilized to receive the desired spectrum, as shown in FIG. 1B. The technique significantly simplifies the overall BAN architecture 100 with the added benefit of receiving the intended spectrum with maximum auto and minimum cross-correlation.

The remote node device 106 may be configured to convert the decoded optical signal into an electrical signal. The decoded optical signal is converted into the electrical signal through one or more of the plurality of PIN photo-detectors 122-(1-P), the plurality of DC block circuits 124-(1-Q), the plurality of electrical amplifiers 126-(1-R), the plurality of electrical splitters 128-(1-S), and the plurality of electrical low pass filters 130-(1-T). As shown in FIG. 1B, the plurality of PIN photo-detectors 122-(1-P) may include at least a first PIN photo-detector 122-1, a second PIN photo-detector 122-2, a third PIN photo-detector 122-3, and a fourth PIN photo-detector 122-4. The plurality of DC block circuits 124-(1-Q) may include at least a first DC block circuit 124-1, a second DC block circuit 124-2, a third DC block circuit 124-3, and a fourth DC block circuit 124-4. The plurality of electrical amplifiers 126-(1-R) may include at least a first electrical amplifier 126-1, a second electrical amplifier 126-2, a third electrical amplifier 126-3, and a fourth electrical amplifier 126-4. The plurality of electrical splitters 128-(1-S) may include a first electrical splitter 128-1, a second electrical splitter 128-2, a third electrical splitter 128-3, and a fourth electrical splitter 128-4. The plurality of electrical low pass filters 130-(1-T) may include a first electrical low pass filter 130-1, a second electrical low pass filter 130-2, a third electrical low pass filter 130-3, and a fourth electrical low pass filter 130-4.

According to an aspect, the plurality of PIN photo-detectors 122-(1-P) may covert the optical signal into the electrical signal. As zero cross-correlation exists between adjacent codes, therefore, no multiple access interference and accompanying optical beat interference is generated at the plurality of PIN photo-detectors 122-(1-P) during the conversion of the optical signal to the electrical signal, significantly elevating the quality of the signal. In an example, photo-detected UWB mono-cycle pulses of the first UWB BAN node device 102-1 may be generated at the output of the first PIN photo-detector 122-1, photo-detected UWB mono-cycle pulses of the second UWB BAN node device 102-2 may be generated at the output of the second PIN photo-detector 122-2, photo-detected UWB mono-cycle pulses of the third UWB BAN node device 102-3 may be generated at the output of the third PIN photo-detector 122-3, and photo-detected UWB mono-cycle pulses of the fourth UWB BAN node device 102-4 may be generated at the output of the fourth PIN photo-detector 122-4.

Figure 5A:
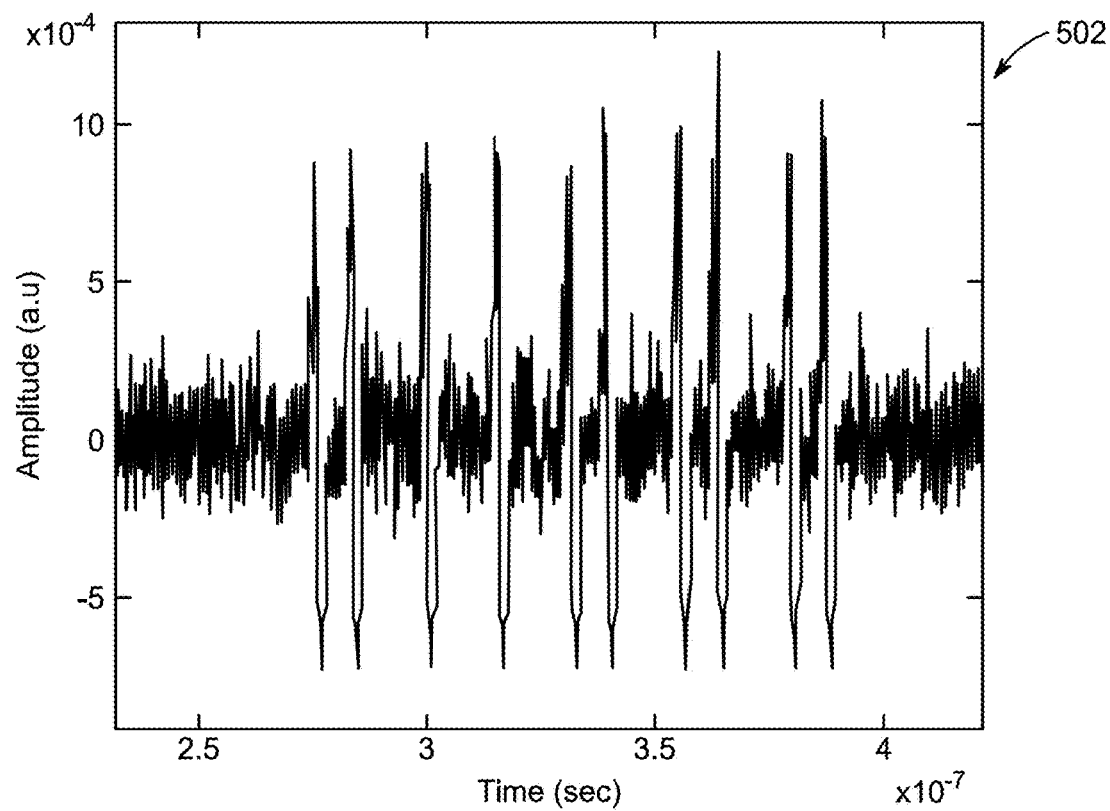
FIG. 5A depicts a time-domain plot of photo-detected UWB mono-cycle pulses detected by a first positive-intrinsic-negative (PIN) photo detector, according to aspects of the present disclosure.
Figure 5B:
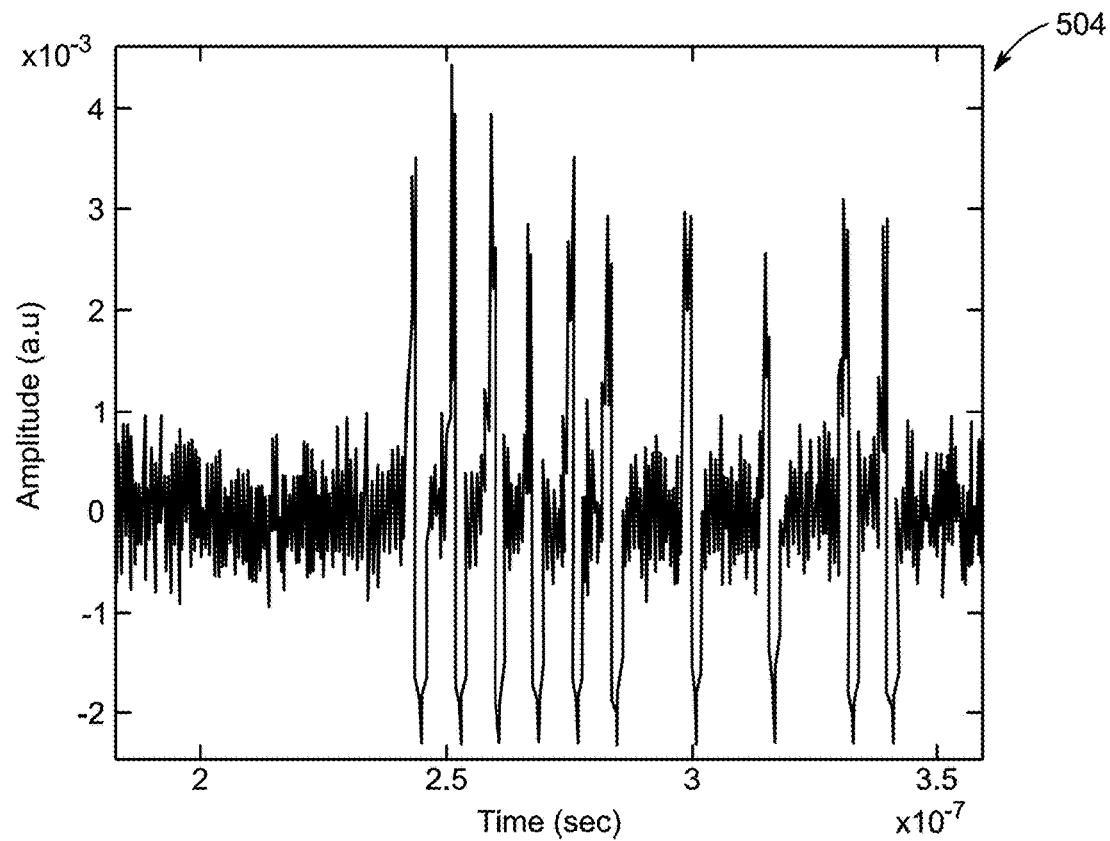
FIG. 5B depicts a time-domain plot of photo-detected UWB mono-cycle pulses detected by a second PIN photo detector, according to aspects of the present disclosure.
Figure 5C:
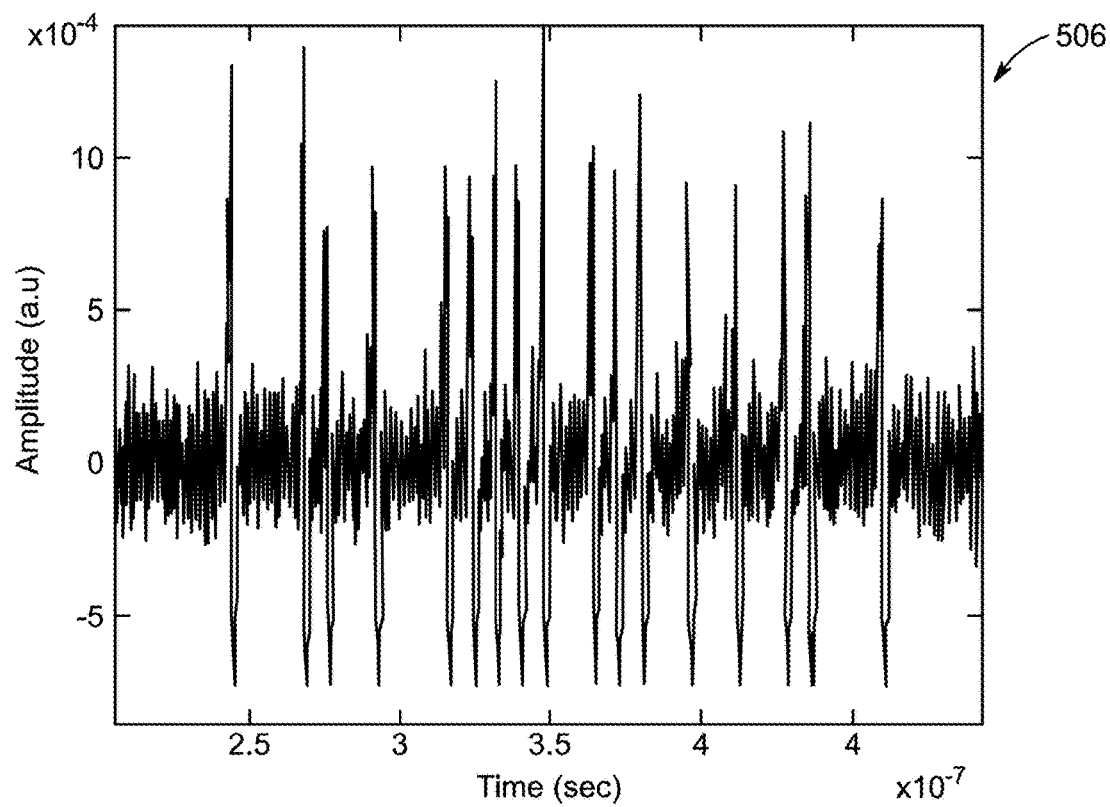
FIG. 5C depicts a time-domain plot of photo-detected UWB mono-cycle pulses detected by a third PIN photo detector, according to aspects of the present disclosure.
Figure 5D:
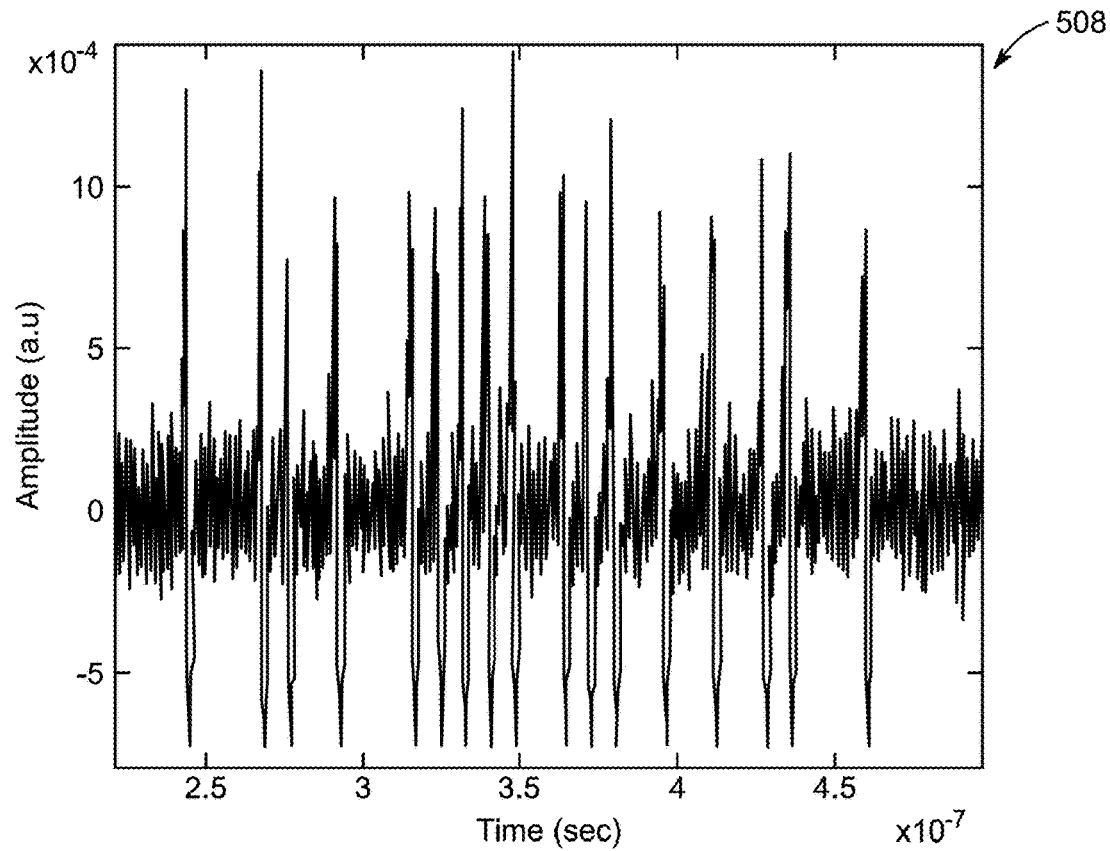
FIG. 5D depicts a time-domain plot of photo-detected UWB mono-cycle pulses detected by a fourth PIN photo detector, according to aspects of the present disclosure.

FIGS. 5A-5D depict time-domain plots of the photo-detected UWB mono-cycle pulses detected at the output of the plurality of PIN photo detectors, according to aspects of the present disclosure. In particular, FIG. 5A depicts time-domain plot 502 of the photo-detected UWB mono-cycle pulses detected at the output of the first PIN photo-detector 122-1. FIG. 5B depicts time-domain plot 504 of the photo-detected UWB mono-cycle pulses detected at the output of the second PIN photo-detector 122-2. FIG. 5C depicts time-domain plot 506 of the photo-detected UWB mono-cycle pulses detected at the output of the third PIN photo-detector 122-3. FIG. 5D depicts time-domain plot 508 of photo-detected UWB mono-cycle pulses detected at the output of the fourth PIN photo-detector 122-4.

According to an aspect, the photo-detected UWB mono-cycle pulses of each UWB BAN node device obtained at the output of the plurality of PIN photo-detectors 122-(1-P) may be passed through the plurality of DC block circuits 124-(1-Q) to remove DC offset and then amplified using the plurality of electrical amplifiers 126-(1-R). The amplified signal is self-mixed, resulting in the conversion of the patient physiological data from UWB mono-cycle pulses to Gaussian pulses by removal of the negative cycle due to multiplication. The resulting electrical signal can be then low pass filtered using the plurality of electrical low pass filters 130-(1-T) and forwarded to a bit rate error (BER) estimator (not shown) for BER estimation. The remote node device 106 may analyze the physiological data of the patient based on the electrical signal. In an aspect, the physiological data of the patient can be analyzed based on the electrical signal being input to the BER estimator. The summary of major simulation parameters for the setup of FIG. 1B is shown in Table 3.

TABLE 3

Major simulation parameters

| Sr. No | Parameters | Values |
|---|---|---|
| 1 | Bit rate (per UWB BAN node device) | 30 Mbps |
| 2 | Transmitter telescope diameter | 5 cm |
| 3 | Receiver telescope diameter | 20 cm |
| 4 | Beam divergence | 2 mrad |
| 5 | Length of FSO link | 0.5 km |
| 6 | Length of each SMF spool | 3.5 m |
| 7 | Refractive index structure parameter | $5 \times 10^{-16}$ |
| 8 | Responsitivity of PIN photo-detector | 0.9 A/W |
| 9 | Optical amplifier gain | 30 dB |
| 10 | Optical amplifier noise figure | 4 dB |
| 11 | Electrical amplifier gain | 10 dB |

According to an aspect of the present disclosure, the BER estimator may evaluate the BER of the electrical signal received by an intended subscriber of the BAN architecture 100. To evaluate the BER of the electrical signal, a Log-normal channel model may be utilized to determine the signal-to-noise ratios (SNRs) for back-to-back (BTB) as well as for turbulence conditions. In an example, to determine the SNRs, only those noise contributors may be considered that are being added between the SAC-OCDMA encoder 108 and the plurality of PIN photo-detectors 122-(1-P), while the simulation results are taken by considering all noise contributors between the plurality of UWB BAN node devices 102-(1-N) and the plurality of PIN photo-detectors 122-(1-P).

Further, the FSO link 150 used by the control node device 104 to transmit the combined optical signal to the remote node device 106 may induce mainly two types of impairments known as attenuation and atmospheric turbulence. Atmospheric turbulence is the consequence of variations in the atmospheric temperature and pressure along the path of the optical signal. It is a major cause of optical signal degradation and results in random variations in signal irradiance, commonly known as intensity scintillation. Various statistical channel models may be implemented to consider the effect of attenuation and atmospheric turbulence on the optical signal. Some of the most commonly used channel models to estimate the effects of atmospheric turbulence on the optical signals include, but are not limited to, the negative exponential, K-distribution, Log-normal distribution, Log-normal-Rician, and Gamma-Gamma channel model. To characterize weak turbulence conditions of a clear sky link, the Log-normal distribution is employed. The probability density function of received light intensity I following a planar wave propagation in terms of variance of log-amplitude fluctuations may be mathematically represented by Equation (5) provided below.

$$p_I(I) = \frac{1}{2I\sqrt{2\pi\sigma_x^2}} \exp\left[-\frac{\ln(I/I_o)^2}{8\sigma_x^2}\right], \quad (5)$$

where $\sigma_x^2 = 0.307 C_n^2 k^{7/6} L^{11/6}$, L is the FSO link length in kilometers, $k = 2\pi/\lambda$ is the wave number, and $C_n^2$ represents the refractive index structure parameter whose values vary from $10^{-17}$ to $10^{-12}$ for weak turbulence to strong turbulence, respectively. In an example, even for a specific link, the refractive index structure parameter can vary over time due to the complex dynamics of atmospheric conditions.

According to an aspect, the SNR may be determined as a ratio of the average desired photo-current $I_b$ received by the intended subscriber to the power of different noise sources generated throughout the BAN architecture 100.

$$SNR = \left[\frac{I_b^2}{i_{bn}^2}\right]. \quad (6)$$

The average desired photo-current in the Equation (6) can also be mathematically represented as:

$$I_b = \Re b W_m P_{sr}, \quad (7)$$

where $b \in \{0, 1\}$ is value of the bit that represents the transmission of binary 1 or 0 by the intended user. $P_{sr}$ represents the power per chip at the receiving end and is equivalent to $$\frac{P_{tx}D^2 e^{-\alpha Y}}{N(\theta d)^2},$$

where $P_{tx}$ is the transmitted power, D is the aperture diameter of the receiving telescope, $\alpha$ is the atmospheric attenuation, d is the distance between the transmitter telescope and the receiver telescope, and $\theta$ is the beam divergence.

In the Equation (7), $\Re$ is the responsivity of the PIN photo-detector that is used to convert the optical signal into the electrical domain. Further, $W_m$ represents power units in the number of chips absorbed by the PIN photo-detector. Furthermore, $W_m = W$ which indicates that maximum power units in the recovered spectrum is absorbed by the PIN photo-detector. The variance of the total noise power for the BAN architecture 100 may be determined as the sum of noise sources generated throughout the BAN architecture 100 that primarily includes optical beat interference $i_{obn}$, relative intensity noise $i_{rn}$, shot noise $i_{sn}$, and thermal noise $i_{tn}$.

$$i_{bn}^2 = i_{obn}^2 + i_{rn}^2 + i_{sn}^2 + i_{tn}^2. \quad (8)$$

As direct detection technique recovers the intended spectrum, therefore, only the desired pulses will hit the PIN photo-detector. Moreover, cross-correlation between the adjacent codes of the DW-ZCC code scheme is equal to 0, therefore, the value of $i_{obn}^2 = 0$. Further, relative intensity noise (RIN) is generated. Moreover, all subscribers can cause cross-talk with the desired signal. Therefore, the power of the RIN with $W_m = W$ can be mathematically represented as:

$$i_{rn}^2 = RN(bWP_{sr} + xP_c)^2 B_e, \quad (9)$$

where, RN is the noise factor with a typical value between $-130$ and $-160$ dBHz$^{-1}$, $B_e$ represents the electrical bandwidth, $P_c$ denotes the optical power in the cross-talk pulses, and x is an event of the interfering pulses from the possible subscribers out of U-1 that transmits bit "1". The average value of x when the number of interfering subscribers that are sending bit "1" at every chip is equal and can be represented as:

$$x = \frac{W_m^2(U-1)}{2L}. \quad (10)$$

In an aspect, the haphazard nature of the photons that are incident upon the PIN photo-diode generates random electrons that result in fluctuation of the photo-current. This phenomenon generates shot noise that is proportional to the incident current times $2EB_e$. Mathematically, the shot noise can be represented as:

$$i_{sn}^2 = 2RE(bW_m P_{sr} + xP_c)B_e. \quad (11)$$

where E is the electron charge. Since direct detection at the intended subscriber recovers non-overlapping spectrum of the DW-ZCC code scheme, therefore, $P_c = 0$ as no cross-talk is observed between the intended and interfering subscriber at the receiving photo-diode. Consequently, the value of $i_{sn}^2$, becomes:

$$i_{sn}^2 = 2REbW_m P_{sr} B_e. \quad (12)$$

The thermal noise generated at the receiving photo-diode of the intended subscriber can be mathematically represented as:

$$i_{tn}^2 = \frac{4K_B T B_e}{R_L}, \quad (13)$$

where T, $K_B$, and $R_L$ represent the temperature, Boltzmann constant, and load resistance, respectively. The total variance of the noise power becomes:

$$i_{bn}^2 = i_{rn}^2 + i_{sn}^2 + i_{tn}^2. \quad (14)$$

If the decision of the received bit is carried out by comparing the total current of the received signal with a threshold current IT, then the BER of the received optical signal can be calculated as:

$$BER_O(I) = Q\left(\frac{I_1 - I_0}{i_{n1} + i_{n0}}\right), \quad (15)$$

where $I_1$ and $i_{n1}$ is the total signal current and noise power for bit "1", and $I_0$ and $i_{n0}$ is the total signal current and noise power for bit "0", respectively. The total BER of the encoded signal that is transmitted over the Log-normal turbulent channel can be mathematically represented as:

$$BER = \int_0^\infty BER_O(I) p_I(I) dI, \quad (16)$$

where, $p_I(I)$ is the probability density function of the Log-normal channel that is used under weak turbulence conditions to model the intensity fluctuations of the received signal at the PIN photo-detector. The BER in Equation (16)

is used to calculate the performance of the BAN architecture 100, in terms of quality of the received signal at the intended photodiode.

Examples and Experiments

The following examples are provided to illustrate further and to facilitate the understanding of the present disclosure.

Experimental Data and Performance Analysis

A) BER Performance

The UWB signals received at the remote node device 106 after being transmitted from the control node device 104 and propagation through the Log-normal channel model are analyzed for BER performance. The eye-diagrams of the Gaussian-shaped electrical signal at the output of the electrical bandpass filters, as shown in FIG. 1B, are used to statistically calculate the BER. The optical power of the signals received at the PIN photo-detectors is varied with the help of an optical attenuator to observe the effect on the BER of the UWB mono-cycle pulses. Apart from turbulence, haze and rain-induced atmospheric attenuations are major detrimental effects in the FSO links. Light haze, heavy haze, light rain, and heavy rain can induce atmospheric attenuation of different values.

Figure 6A:
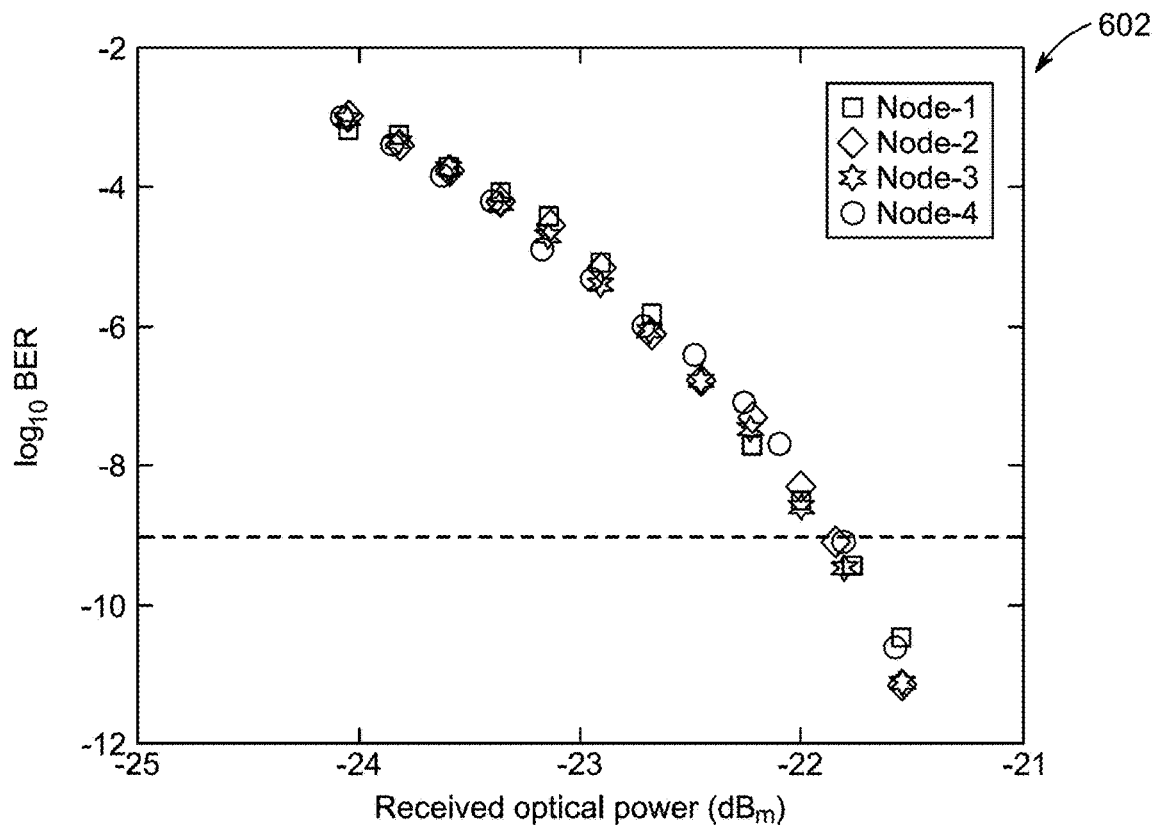
FIG. 6A shows bit rate error (BER) versus received optical power plot for the first UWB BAN node device, the second UWB BAN node device, the third UWB BAN node device, and the fourth UWB BAN node device for back-to-back (BTB) case, according to aspects of the present disclosure.
Figure 6B:
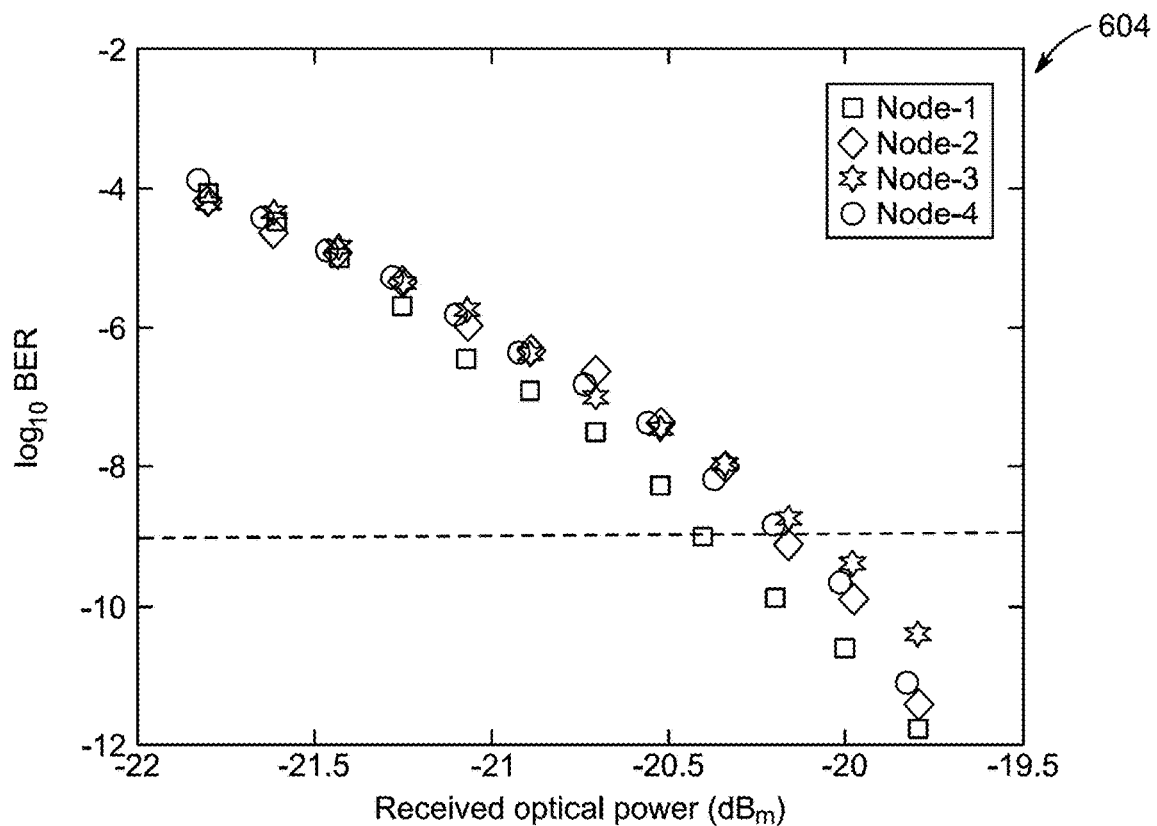
FIG. 6B shows BER versus received optical power plot for the first UWB BAN node device, the second UWB BAN node device, the third UWB BAN node device, and the fourth UWB BAN node device for atmospheric attenuation at 5 dB/km, according to aspects of the present disclosure.
Figure 6C:
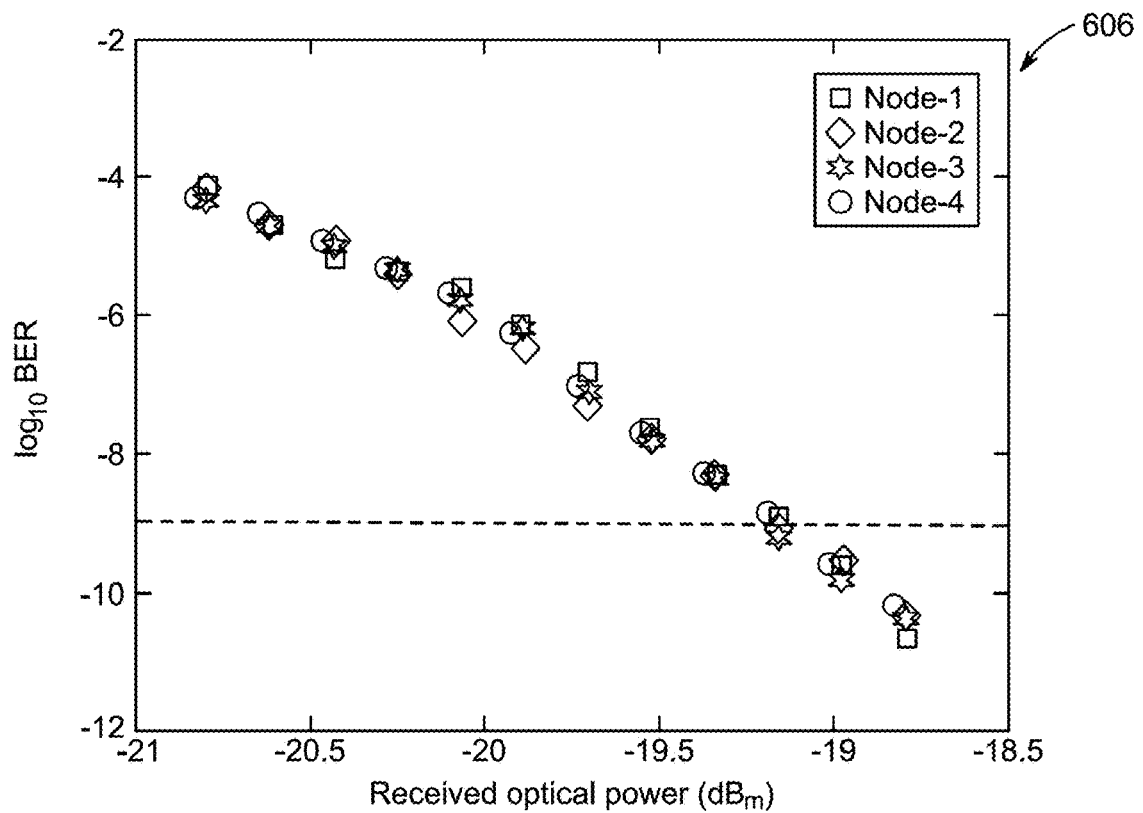
FIG. 6C shows BER versus received optical power plot for the first UWB BAN node device, the second UWB BAN node device, the third UWB BAN node device, and the fourth UWB BAN node device for atmospheric attenuation at 20 dB/km, according to aspects of the present disclosure.
Figure 6D:
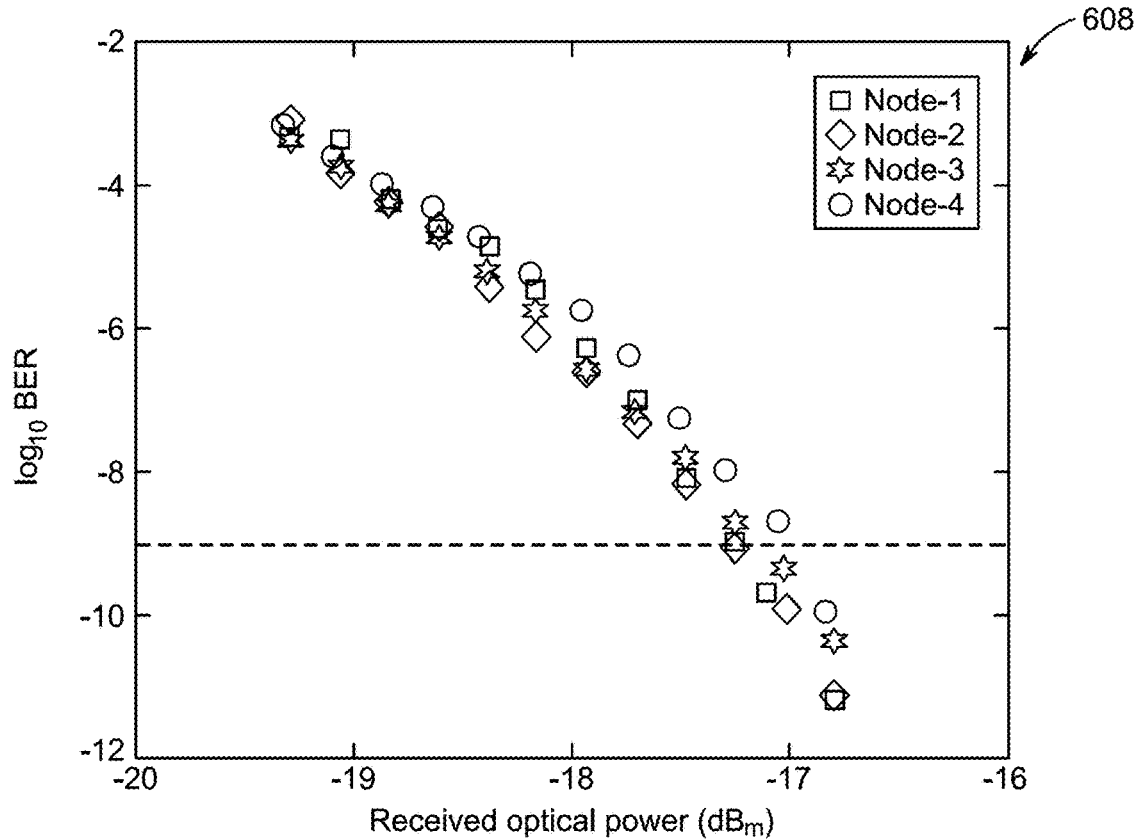
FIG. 6D shows BER versus received optical power plot for the first UWB BAN node device, the second UWB BAN node device, the third UWB BAN node device, and the fourth UWB BAN node device for atmospheric attenuation at 35 dB/km, according to aspects of the present disclosure.

The values of atmospheric attenuation are chosen in the range of 5-35 dB/km, which covers most of the weather conditions. FIGS. 6A-6D show the BER versus received optical power plots for UWB BAN node devices obtained at different values of atmospheric attenuation while considering weak turbulence regime which is specific to the Log-normal channel model. In FIGS. 6A to 6D, Node-1 represents the first UWB BAN node device 102-1, Node-2 represents the second UWB BAN node device 102-2, Node-3 represents the third UWB BAN node device 102-3, and Node-4 represents the fourth UWB BAN node device 102-4. In particular, FIG. 6A shows the BER versus received optical power plot 602 for the first UWB BAN node device 102-1, the second UWB BAN node device 102-2, the third UWB BAN node device 102-3, and the fourth UWB BAN node device 102-4 for the back-to-back (BTB) case. FIG. 6B shows the BER versus received optical power plot 604 for the first UWB BAN node device 102-1, the second UWB BAN node device 102-2, the third UWB BAN node device 102-3, and the fourth UWB BAN node device 102-4 for the atmospheric attenuation at 5 dB/km. FIG. 6C shows the BER versus received optical power plot 606 for the first UWB BAN node device 102-1, the second UWB BAN node device 102-2, the third UWB BAN node device 102-3, and the fourth UWB BAN node device 102-4 for the atmospheric attenuation at 20 dB/km. FIG. 6D shows the BER versus received optical power plot 608 for the first UWB BAN node device 102-1, the second UWB BAN node device 102-2, the third UWB BAN node device 102-3, and the fourth UWB BAN node device 102-4 for the atmospheric attenuation at 35 dB/km.

Receiver sensitivity is defined as the minimum optical power required to achieve a BER of $10^{-9}$. Due to small difference in values of receiver sensitivity of UWB BAN node devices, BER plots for the first UWB BAN node device 102-1 can be considered as an example. Therefore, the minimum value of receiver sensitivity for the BTB case of the first UWB BAN node device 102-1 is around −21.8 dBm. The sensitivity becomes −20.3 dBm for $\alpha_{atm}=5$ dB/km, resulting in a power penalty of around 1.5 dB. Furthermore, the minimum receiver sensitivity of the first UWB BAN node device 102-1 is around —17.2 dBm for $\alpha_{atm}=35$ dB/km, resulting in a power penalty of around 2 dB. The BER plots 602, 604, 606, and 608 show that the receiver sensitivities are degraded when the value of atmospheric attenuation is increased. Small variations in receiver sensitivity are observed among the first UWB BAN node device 102-1, the second UWB BAN node device 102-2, the third UWB BAN node device 102-3, and the fourth UWB BAN node device 102-4. Overall, the first UWB BAN node device 102-1, the second UWB BAN node device 102-2, the third UWB BAN node device 102-3, and the fourth UWB BAN node device 102-4 provide acceptable BER values indicating the suitability of the BAN architecture 100 for employment at healthcare centers.

Figure 7A:
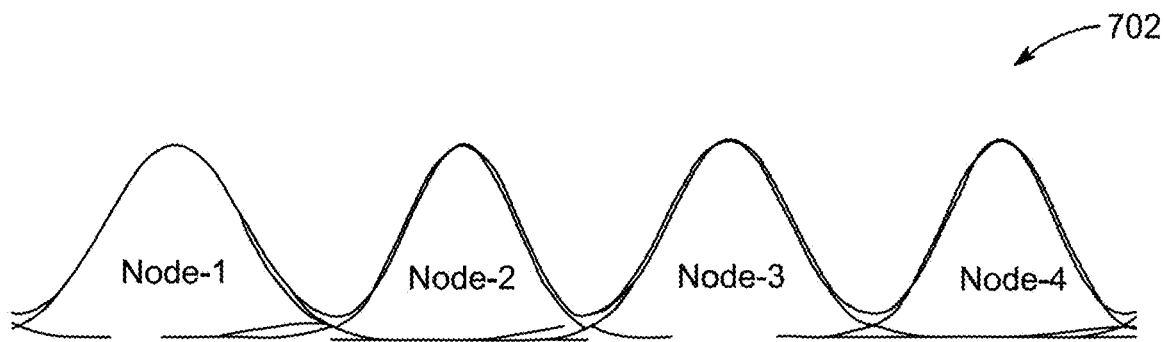
FIG. 7A shows eye diagrams for the first UWB BAN node device, the second UWB BAN node device, the third UWB BAN node device, and the fourth UWB BAN node device for BTB case, according to aspects of the present disclosure.
Figure 7B:
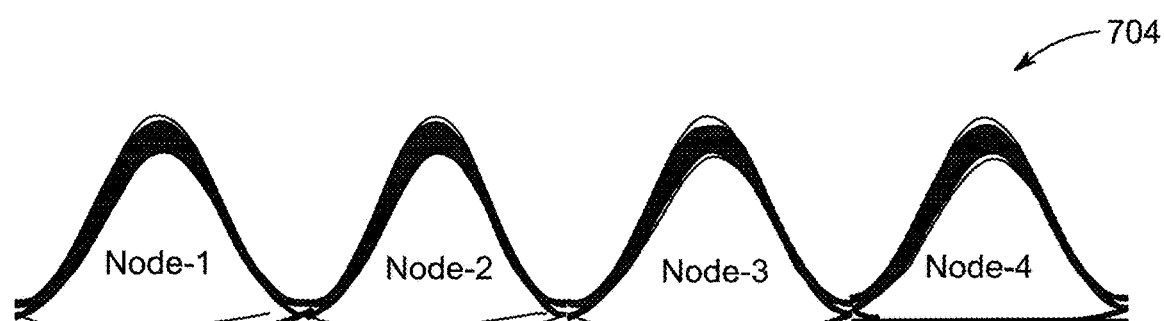
FIG. 7B shows eye diagrams for the first UWB BAN node device, the second UWB BAN node device, the third UWB BAN node device, and the fourth UWB BAN node device for atmospheric attenuation at 5 dB/km, according to aspects of the present disclosure.
Figure 7C:
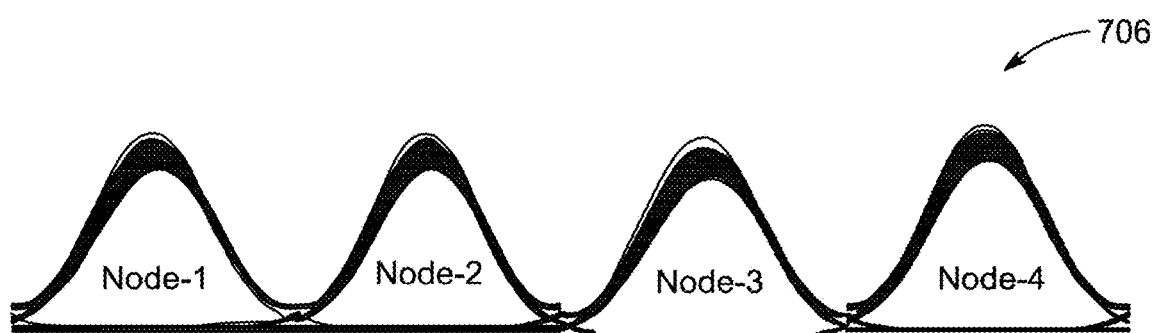
FIG. 7C shows eye diagrams for the first UWB BAN node device, the second UWB BAN node device, the third UWB BAN node device, and the fourth UWB BAN node device for atmospheric attenuation at 20 dB/km, according to aspects of the present disclosure.
Figure 7D:
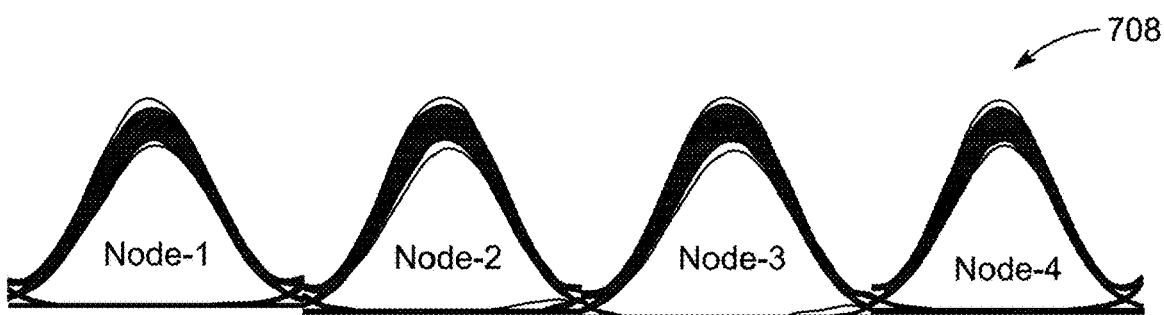
FIG. 7D shows eye diagrams for the first UWB BAN node device, the second UWB BAN node device, the third UWB BAN node device, and the fourth UWB BAN node device for atmospheric attenuation at 35 dB/km, according to aspects of the present disclosure.

To further elaborate the effect of FSO attenuation on the UWB BAN node devices, FIGS. 7A-7D show eye-diagrams of the UWB BAN node devices at different values of atmospheric attenuation. In FIGS. 7A to 7D, Node-1 represents the first UWB BAN node device 102-1, Node-2 represents the second UWB BAN node device 102-2, Node-3 represents the third UWB BAN node device 102-3, and Node-4 represents the fourth UWB BAN node device 102-4. In particular, FIG. 7A shows eye diagrams 702 for the first UWB BAN node device 102-1, the second UWB BAN node device 102-2, the third UWB BAN node device 102-3, and the fourth UWB BAN node device 102-4 for the back-to-back (BTB) case. FIG. 7B shows eye diagrams 704 for the first UWB BAN node device 102-1, the second UWB BAN node device 102-2, the third UWB BAN node device 102-3, and the fourth UWB BAN node device 102-4 for the atmospheric attenuation at 5 dB/km. FIG. 7C shows eye diagrams 706 for the first UWB BAN node device 102-1, the second UWB BAN node device 102-2, the third UWB BAN node device 102-3, and the fourth UWB BAN node device 102-4 for the atmospheric attenuation at 20 dB/km. FIG. 7D shows eye diagrams 708 for the first UWB BAN node device 102-1, the second UWB BAN node device 102-2, the third UWB BAN node device 102-3, and the fourth UWB BAN node device 102-4 for the atmospheric attenuation at 35 dB/km.

It may be observed that the opening of the eye reduces and amplitude variation increases on increasing the value of atmospheric attenuation from 5 to 35 dB/km.

Table 4 illustrates a performance of the BAN architecture 100 in comparison to conventional arts. It may be observed from Table 4 that the BAN architecture 100 outperforms the conventional arts on the basis of various factors, such as data rate, FSO range, and security. A dash "-" in certain rows of Table 4 represents that the information about this parameter is not provided in the particular study.

TABLE 4

Comparison of major results of the BAN architecture with results of the past related studies

| Study | Type of node | Data rate | FSO range | Security | Cost analysis |
|---|---|---|---|---|---|
| A | IR | 1 Mbps | 5 m | — | No |
| B | IR | 14.3 Mbps | 1.5 m | OCDMA | No |
| C | LED | 4.2 Mbps | 5 m | — | No |
| D | LED | — | — | Walsh codes | No |
| E | LED | — | 1.5 m | — | No |
| Present Disclosure | UWB | 30 Mbps | 0.5 km | SAC-OCDMA | Yes |

Study A, which was described in "Performance evaluation of wireless optical communication for mobile body area network scenario with blocking effects" that was published on IET Optoelectronics, vol. 9, no. 5, pp. 211-217, 2015, describes performance evaluation of wireless optical communication for mobile BAN scenario with blocking effects. Study B, which was described in "Optical wireless links as an alternative to radio-frequency for medical body area networks" that was published on IEEE Journal on Selected Areas in Communications, vol. 33, no. 9, pp. 2002-2010, 2015, describes optical wireless links as an alternative to radio-frequency for medical BANs. Study C, which was described in "Investigation of wireless optical technology for communication between on-body nodes" that was published on 2nd IEEE international workshop on optical wireless communications (IWOW), pp. 79-83, 2013, discusses investigation of wireless optical technology for communication between on-body nodes. Study D, which was described in "A novel optical body area network for transmission of multiple patient vital signs" that was published on Ninth IEEE international conference on ubiquitous and future networks (ICUFN), pp. 542-544, 2017, describes optical BAN for transmission of multiple patient vital signs. Study E, which was described in "Patient mobility support for indoor non-directed optical body area networks" that was published on Sensors, vol. 19, no. 10, pp. 2297-2310, discusses about patient mobility support for indoor non-directed optical BANs.

B) Cost Analysis

The idea of deploying FSO links instead of the optical fiber (OF) media is based upon reduced deployment cost and lower maintenance cost along with high flexibility, mobility, and lower deployment time. A major part of the deployment cost for the OF media is spent on trenching between the transmitter and receiver modules, which requires a relatively large number of specialized laborers to dig the trench and lay the optical fiber media. Furthermore, trenches are prone to fiber cuts or breaks owing to the continuous development of surrounding infrastructure. On the contrary, the employment of an FSO link between the transmitter and receiver modules introduces a certain level of simplicity and reduction in deployment and maintenance costs. Cost of FSO links can be as low as ⅕ times of the OF based networks. However, such figures are subject to span and the number of subscribers in the network. To demonstrate the feasibility of FSO links as compared to OF media in terms of deployment cost and capital expenditure (CAPEX), the following Equations (17) and (18) can be used.

$$C_{OF} = (l \times \text{trenching}) + (l \times OF), \quad (17)$$

where l represents the total length of trenching.

$$C_{FSO} = \text{Cost of } FSO \text{ transmitter/receiver module}. \quad (18)$$

It may be observed from Equation (17) that the deployment cost for OF media encompasses the total amount spent on the trenching along with cost of OF media. On the other hand, deployment cost for FSO media as given in Equation (18) demonstrates that the overall cost is dependent on the cost of FSO transmitter and receiver modules only. With reference to FIG. 1B of the BAN architecture 100, the employment of OF media or FSO link between the control node device 104 and the remote node device 106 may affect the overall cost for a fixed number of nodes. Therefore, the cost of the SAC-OCDMA encoder 108 and the SAC-OCDMA decoder 116 may not be considered in this analysis. Similarly, the installation cost is not considered owing to large variation among vendors. Table 5 shows the overall deployment cost for both scenarios by considering the costs of trenching, OF, and FSO modules as USD 1000, USD 25, and USD 500, respectively.

TABLE 5

CAPEX for both scenarios corresponding to different network spans

| Sr. No | Network block | CAPEX($) | | | |
|---|---|---|---|---|---|
| | | 0.5 km | 1 km | 1.5 km | 2 km |
| 1 | OF | 512.5 | 1025 | 1550 | 2050 |
| 2 | FSO | 500 | 500 | 500 | 500 |

Table 5 shows the comparison between the network blocks of interest including OF media and FSO link over a span of 0.5, 1, 1.5, and 2 km. It can be observed that the CAPEX for the OF media increases with an increase in the length of the link. On the contrary, the cost of the FSO link remains the same over the entire span. Thus, it can be concluded that the FSO link is a viable option for the deployment of a small span network with relatively high data rate requirements. Furthermore, deployment of the FSO link not only minimizes the cost but also provides a certain level of simplicity in installation and maintenance costs that can be traded-of with a slight increase in CAPEX for smaller span networks. Therefore, the BAN architecture 100 provides good BER results with added advantages of low complexity, low cost, and security.

Accordingly, UWB over FSO link is implemented for OBANs to take advantage of the high bandwidth offered by the UWB signals and the FSO link. Due to their broad spectral width, the UWB signals are less prone to EMI which is a major issue in environments composed of multiple electrical components. Furthermore, EMI between UWB BAN node devices and medical equipments as well as RF exposure of the UWB BAN node devices to human body is reduced by employing low transmit power UWB wireless technology. The security of the FSO link is further enhanced by implementing the SAC-OCDMA encoder 108 with the help of multiple wavelengths generated by the CW laser array 114.

The BAN architecture 100 can be employed for the implementation of e-health and telemedicine platforms in all kinds of assisted living facilities and hospitals. Further, simulations are performed using the commercial tool known as OptiSystem. OptiSystem software is the latest and most powerful commercial design tool that enables the system designers to plan, test, and simulate almost every type of optical link in the physical layer of optical network. It offers optical communication system design and planning from component to system level, and visually presents analysis and scenarios.

Figure 8:
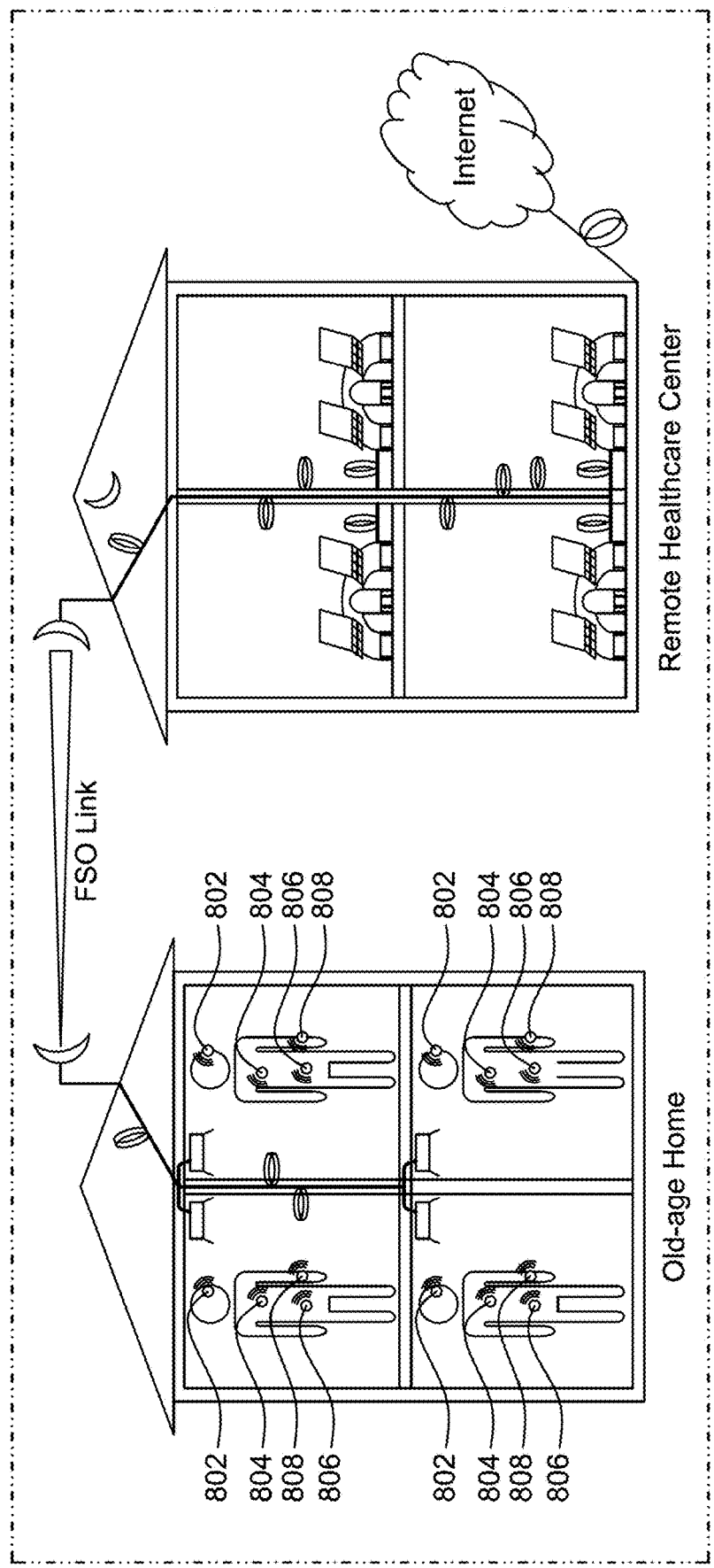
FIG. 8 shows an application scenario of the BAN architecture, according to aspects of the present disclosure.

In an example, the application of the BAN architecture 100 is best suited in old-age homes, where elder citizens having multiple chronic diseases are living. The application scenario of the BAN architecture 100 is shown in FIG. 8. Multiple patients with limited mobility inhabit in rooms having dimensions of 10 m×8 m situated in an old-age home, as shown in FIG. 8. Each patient is equipped with four on-body UWB BAN node devices (for example, a first UWB BAN node device 802, a second UWB BAN node device 804, a third UWB BAN node device 806, and a fourth UWB BAN node device 808). The UWB BAN node devices may sense vital signs, such as pulse rate, body temperature, ECG, and EEG activities of the patients. The UWB BAN node devices transmit real-time data of the vital signs of the patients in the form of low PSD UWB signals towards control node devices located at a fixed position which is 8 m high from room floor. The UWB BAN node devices help in minimizing the EMI as well as the RF exposure to the patients. Each UWB BAN node device may transmit simultaneously at a different radio frequency to avoid the interference among UWB signals at control node devices. The optical signals of all control node devices are combined and then transmitted over the FSO link towards a remote healthcare center. The FSO link provides a cost-efficient solution to implement the BAN architecture as compared to RF and optical fiber-based BANs. As FSO links are prone to eavesdropping, privacy and multiple access in the transmission is achieved using SAC-OCDMA scheme which is implemented at the control node devices. The combined signal is decoded at the remote healthcare center. After optical to electrical conversion, the patient data is processed and interpreted by a nursing staff. The application scenario provides comprehensive and alternative e-health and telemedicine platform for optimum nursing and look after of elder citizens living in old-age homes. The application scenario also minimizes the healthcare expenditures including permanent stationing of nursing staff at old-age homes, regular visits of physicians or elder citizens visits to cardiologist or neurologist, etc.

Figure 9:
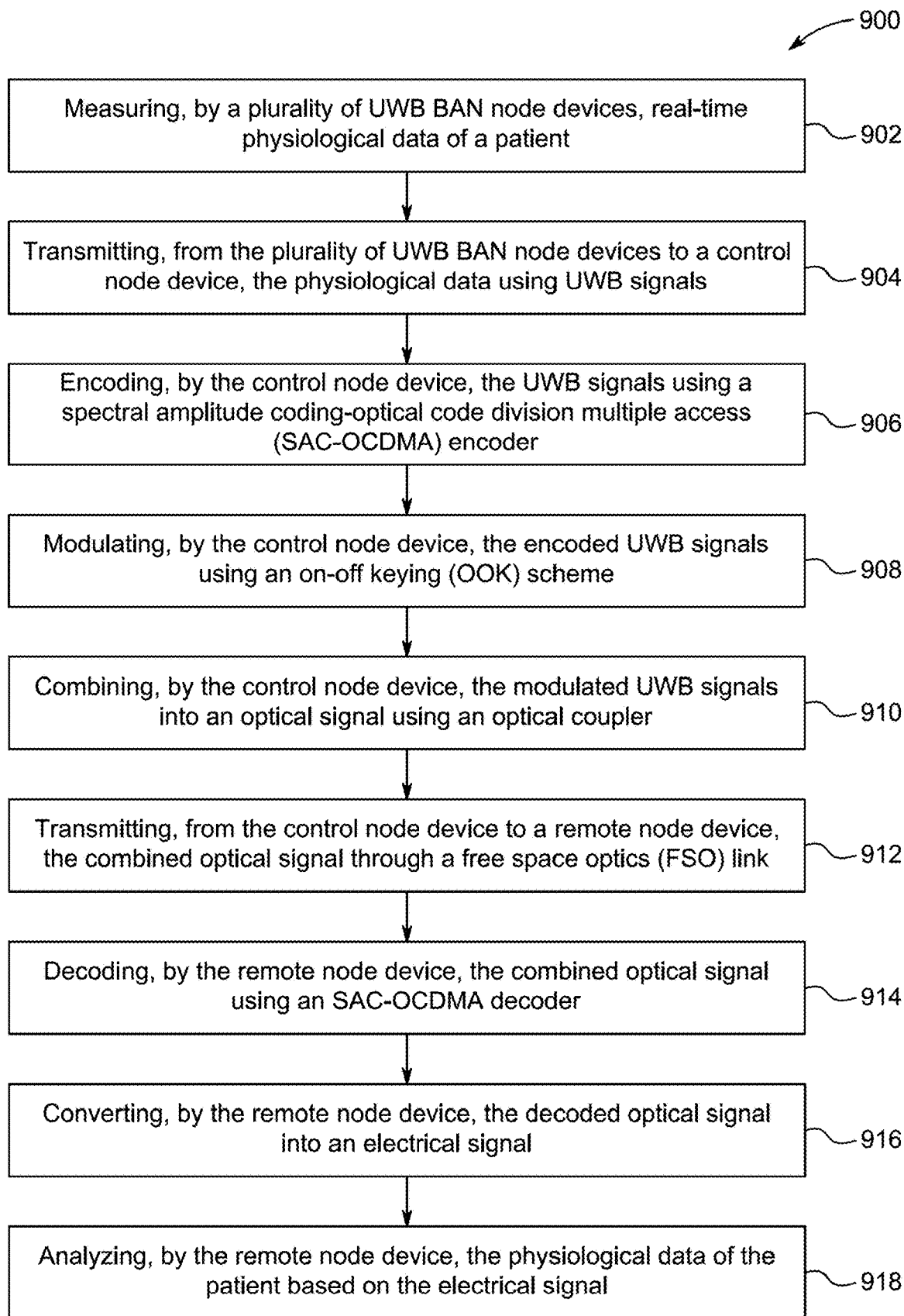
FIG. 9 illustrates a method for a BAN architecture including a plurality of UWB BAN node devices, a control node device, and a remote node device, according to aspects of the present disclosure.

FIG. 9 illustrates a method 900 for the body area network (BAN) architecture 100 including the plurality of UWB BAN node devices 102-(1-N), the control node device 104, and the remote node device 106, according to aspects of the present disclosure. The method 900 can be executed by computer hardware such as a controller 1000 in FIG. 10, a data processing system 1100 in FIG. 11, a processor 1130 in FIG. 11 and FIG. 12, distributed components in FIG. 13, and the like. The method 900 can also be implemented in software instructions, thus when the computer hardware executes the software instructions, the computer hardware performs the method 900.

At step 902, the method 900 includes measuring, by the plurality of UWB BAN node devices 102-(1-N), real-time physiological data of a patient. According to an aspect, the plurality of UWB BAN node devices 102-(1-N) may measure real-time physiological data of the patient.

At step 904, the method 900 includes transmitting, from the plurality of UWB BAN node devices 102-(1-N) to the control node device 104, the physiological data using UWB signals. According to an aspect, the plurality of UWB BAN node devices 102-(1-N) may transmit the physiological data to the control node device 104 using the UWB signals. In an example, each of the UWB signals operates at a different carrier frequency.

At step 906, the method 900 includes encoding, by the control node device 104, the UWB signals using the SAC-OCDMA encoder 108. According to an aspect, the control node device 104 may encode the UWB signals using the SAC-OCDMA encoder 108. The SAC-OCDMA encoder 108 includes the CW laser array 114 that generates two wavelengths for each of the UWB signals.

At step 908, the method 900 includes modulating, by the control node device 104, the encoded UWB signals using an on-off keying (OOK) scheme. According to an aspect, the control node device 106 may modulate the encoded UWB signals using the OOK scheme.

At step 910, the method 900 includes combining, by the control node device 104, the modulated UWB signals into an optical signal using the optical coupler 110. According to an aspect, the control node device 104 may combine the modulated UWB signals into the optical signal using the optical coupler 110. In an aspect, the modulated UWB signals are combined into the optical signal based on the DW-ZCC code scheme. The encoded UWB signals may be modulated using the plurality of MZMs 112-(1-M).

At step 912, the method 900 includes transmitting, from the control node device 104 to the remote node device 106, the combined optical signal through the FSO link 150. According to an aspect, the control node device 104 may transmit the combined optical signal to the remote node device 106 through the FSO link 150. In an aspect, the combined optical signal may be transmitted by a transmitter telescope and received by a receiver telescope, the transmitter and receiver telescopes are connected to the control node device 104 and the remote node device 106 through respective single-mode fibers, respectively. In an aspect, the combined optical signal may be amplified using the optical amplifier 140 and then transmitted by the transmitter telescope to the remoted node device 106.

At step 914, the method 900 includes decoding, by the remote node device 106, the combined optical signal using the SAC-OCDMA decoder 116. According to an aspect, the remote node device 106 may decode the combined optical signal using the SAC-OCDMA decoder 116. The SAC-OCDMA decoder 116 includes the WDM de-multiplexer 118 that de-multiplexes the combined optical signal. Further, the remote node device 106 includes the plurality of optical couplers 120-(1-O). Each optical coupler is associated with a respective one of the UWB signals and is configured to combine the wavelengths of the de-multiplexed optical signal corresponding to the respective one of the UWB signals.

At step 916, the method 900 includes converting, by the remote node device 106, the decoded optical signal into an electrical signal. According to an aspect, the remote node device 106 may convert the decoded optical signal into the electrical signal. In an example, the decoded optical signal is converted into the electrical signal through a PIN photodetector, a DC block circuit, an electrical amplifier, an electrical splitter, and an electrical low pass filter.

At step 918, the method 900 includes analyzing, by the remote node device 106, the physiological data of the patient based on the electrical signal. According to an aspect, the remote node device 106 may analyze the physiological data of the patient based on the electrical signal. The physiological data of the patient may be analyzed based on the electrical signal being input to a BER estimator.

Figure 10:
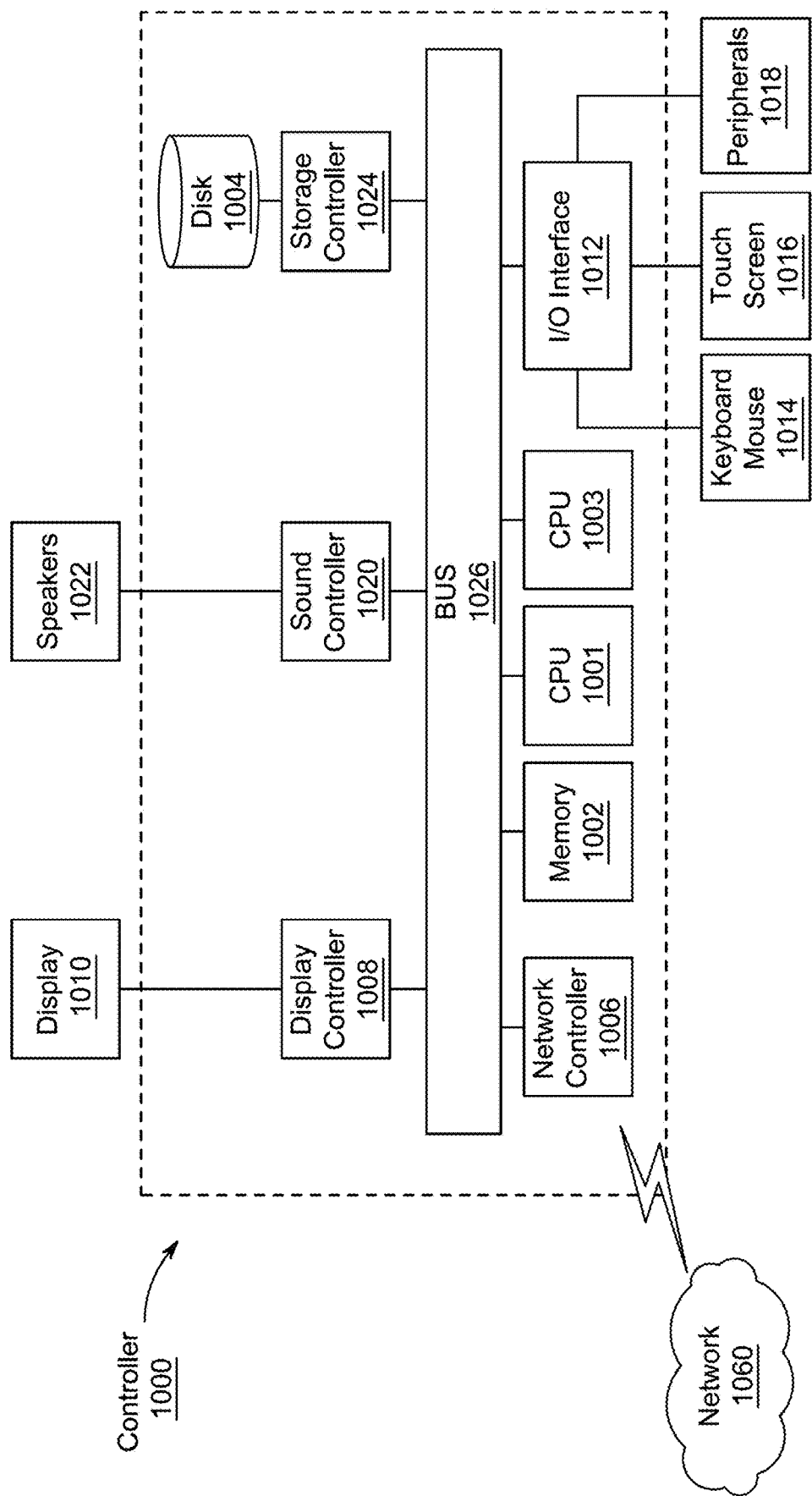
FIG. 10 is an illustration of a non-limiting example of details of computing hardware used in the computing system, according to aspects of the present disclosure.

FIG. 10 is an illustration of a non-limiting example of details of computing hardware used in the computing system, according to exemplary aspects of the present disclosure. In FIG. 10, a controller 1000 is described which is a computing device (for example, BAN architecture 100) and includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001 and/or CPU 1003 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, the CPU 1001 and/or CPU 1003 may be a Xenon or Core processor from Intel of America or an Opteron processor from AMD of America, or may be other processor types that would be recognized by one of ordinary skill in the art. Alternatively, the CPU 1001 and/or CPU 1003 may be implemented on an FPGA, ASIC, PLD or using discrete logic circuits, as one of ordinary skill in the art would recognize. Further, the CPU 1001 and/or CPU 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
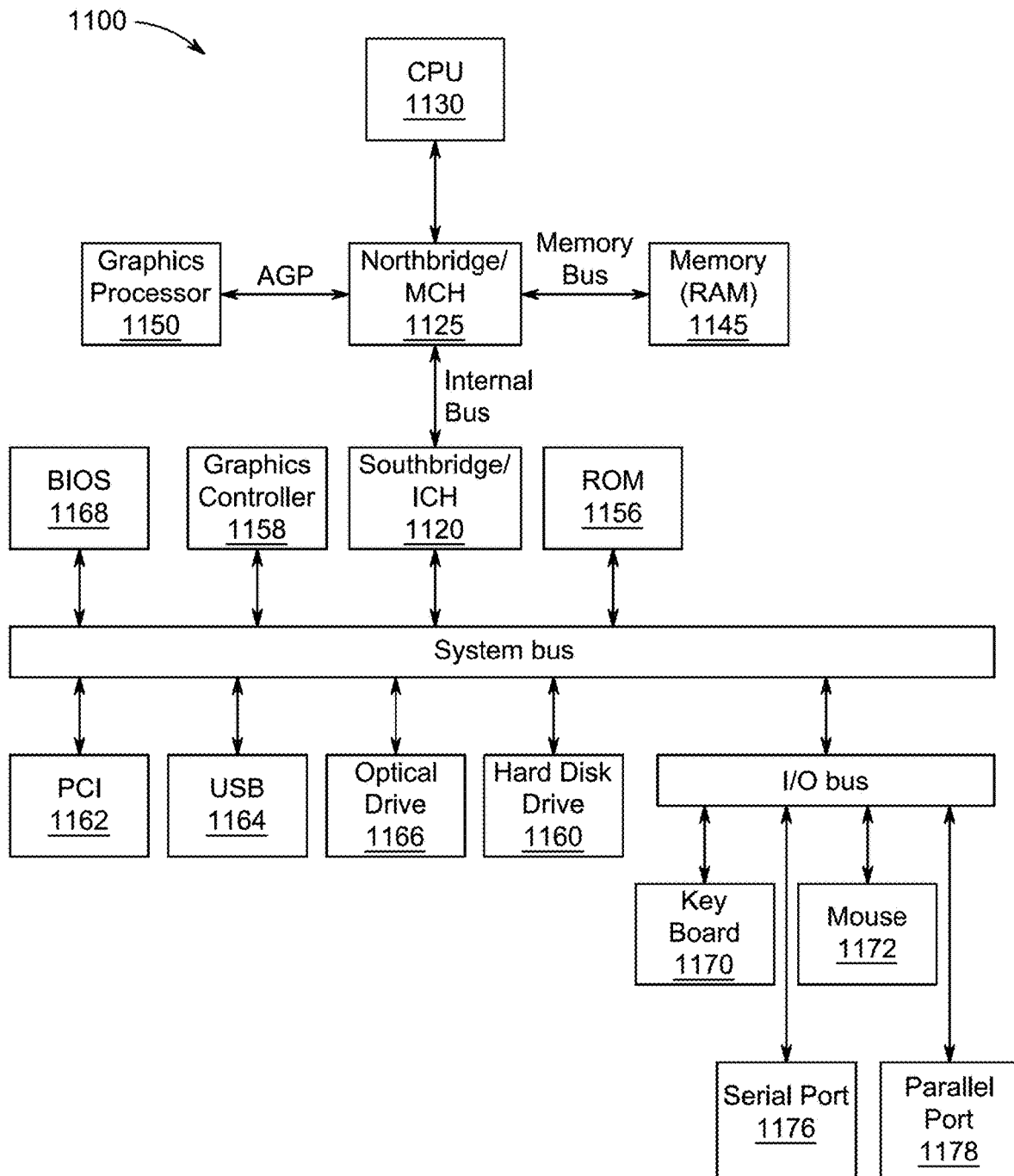
FIG. 11 is an exemplary schematic diagram of a data processing system used within the computing system, according to aspects of the present disclosure.

FIG. 11 shows a schematic diagram of a data processing system 1100 used within the computing system, according to exemplary aspects of the present disclosure. The data processing system 1100 is an example of a computer in which code or instructions implementing the processes of the illustrative aspects of the present disclosure may be located. In FIG. 11, the data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
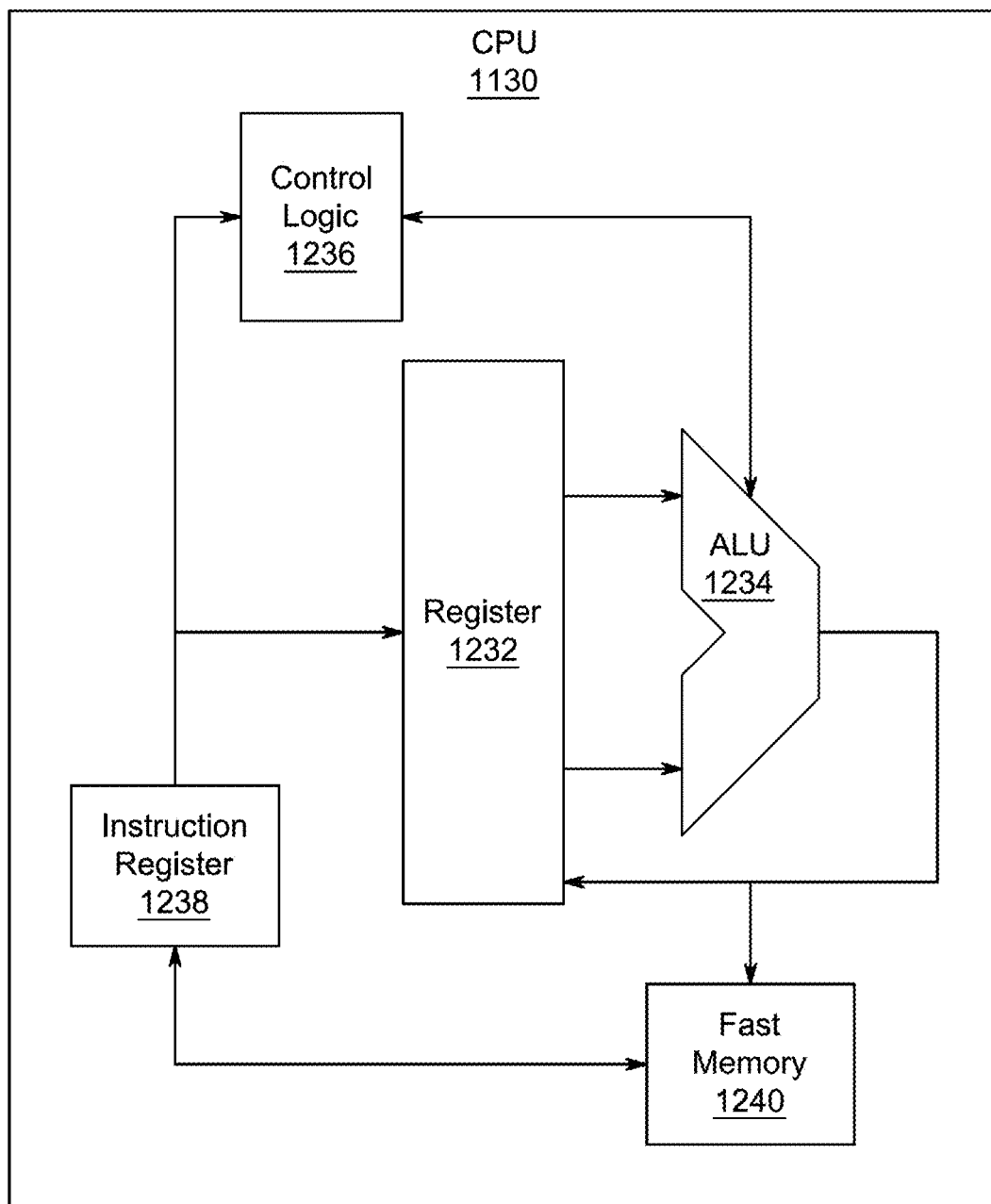
FIG. 12 is an exemplary schematic diagram of a processor used with the computing system, according to aspects of the present disclosure.

For example, FIG. 12 shows an example of the CPU 1130. In the CPU 1130, the instruction register 1238 retrieves instructions from the fast memory 1240. At least part of these instructions is fetched from the instruction register 1238 by the control logic 1236 and interpreted according to the instruction set architecture of the CPU 1130. Part of the instructions can also be directed to the register 1232. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1000 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 11120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
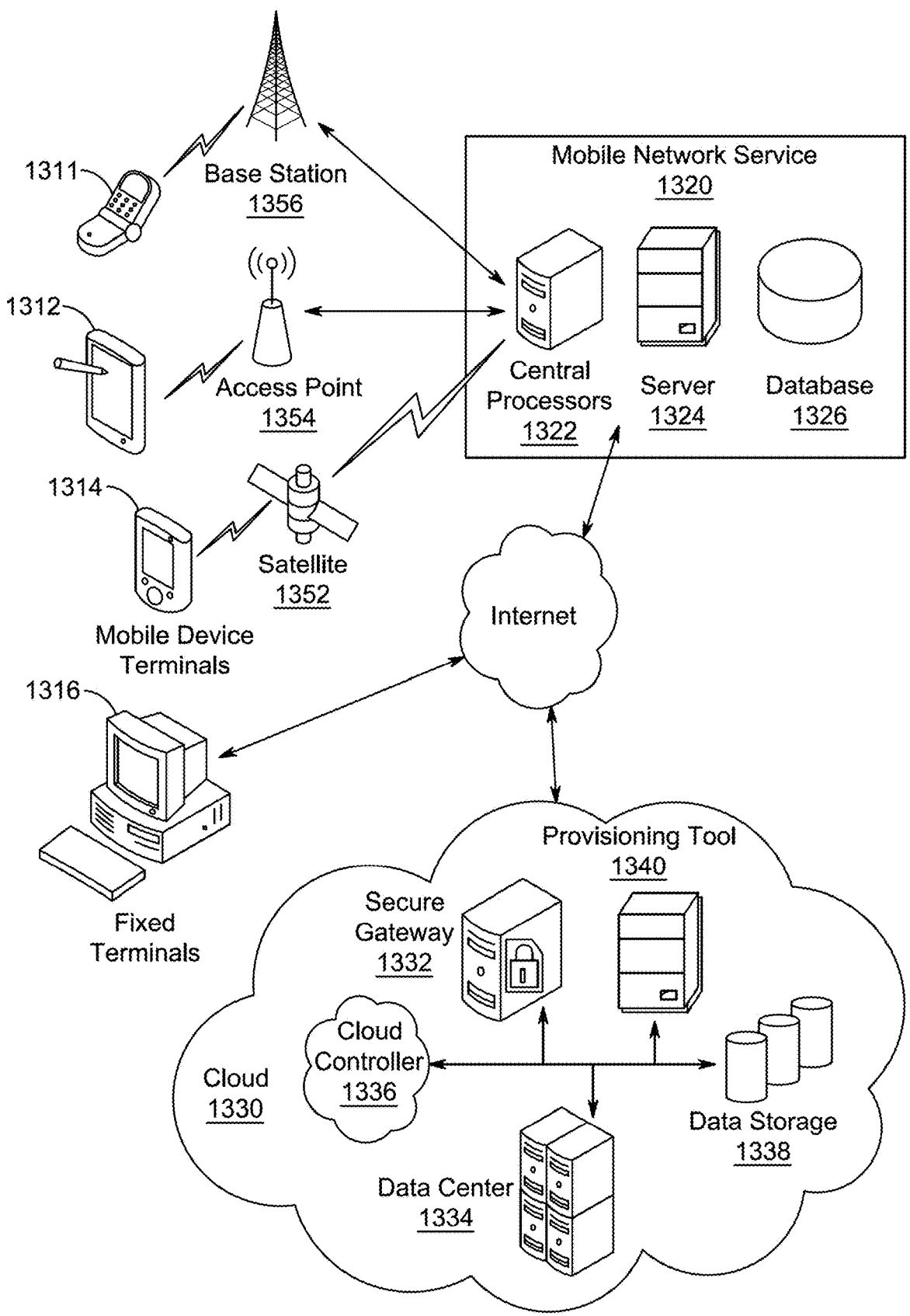
FIG. 13 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). More specifically, FIG. 13 illustrates client devices including a smart phone 1311, a tablet 1312, a mobile device terminal 1314 and fixed terminals 1316. These client devices may be commutatively coupled with a mobile network service 1320 via base station 1356, access point 1354, satellite 1352 or via an internet connection. Mobile network service 1320 may comprise central processors 1322, a server 1324 and a database 1326. Fixed terminals 1316 and mobile network service 1320 may be commutatively coupled via an internet connection to functions in cloud 1330 that may comprise security gateway 1332, data center 1334, cloud controller 1336, data storage 1338 and provisioning tool 1340. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for measuring physiological data with a body area network (BAN) architecture including a plurality of ultra-wideband (UWB) BAN node devices, a control node device, and a remote node device, the method comprising:
mounting the plurality of ultra-wideband (UWB) BAN node devices on a human body,
measuring, by the plurality of UWB BAN node devices, real-time physiological data of a patient, wherein the real-time physiological data include a pulse rate, a body temperature, an electrocardiogram (ECG) activity, and an electroencephalogram (EEG) activity;
transmitting, from the plurality of UWB BAN node devices to the control node device, the physiological data using UWB signals;
encoding, by the control node device, the UWB signals using a spectral amplitude coding-optical code division multiple access (SAC-OCDMA) encoder;
modulating, by the control node device, the encoded UWB signals using an on-off keying (OOK) scheme;
combining, by the control node device, the modulated UWB signals into an optical signal using an optical coupler;
transmitting, from the control node device to the remote node device, the combined optical signal through a free space optics (FSO) link;
decoding, by the remote node device, the combined optical signal using an SAC-OCDMA decoder;
converting, by the remote node device, the decoded optical signal into an electrical signal; and
analyzing, by the remote node device, the physiological data of the patient based on the electrical signal.

2. The method of claim 1, wherein each of the UWB signals operates at a different carrier frequency.

3. The method of claim 1, wherein the SAC-OCDMA encoder includes a continuous wave (CW) laser array that generates two wavelengths for each of the UWB signals.

4. The method of claim 1, wherein the modulated UWB signals are combined into the optical signal based on a double weight zero cross-correlation (DW-ZCC) code scheme.

5. The method of claim 1, wherein the encoded UWB signals are modulated using a plurality of Mach-Zehnder modulators (MZMs).

6. The method of claim 1, wherein the combined optical signal is transmitted by a transmitter telescope and is received by a receiver telescope, the transmitter and receiver telescopes being connected to the control node and remote node devices through respective single-mode fibers, respectively.

7. The method of claim 1, wherein the SAC-OCDMA decoder includes a wavelength division multiplexing (WDM) de-multiplexer that de-multiplexes the combined optical signal.

8. The method of claim 7, wherein the remote node device includes a plurality of optical coupler, each optical coupler being associated with a respective one of the UWB signals and being configured to combine wavelengths of the de-multiplexed optical signal corresponding to the respective one of the UWB signals.

9. The method of claim 1, wherein the decoded optical signal is converted into the electrical signal through a positive-intrinsic-negative (PIN) photo-detector, a direct current (DC) block circuit, an electrical amplifier, an electrical splitter, and an electrical low pass filter.

10. The BAN architecture of claim 1, wherein the physiological data of the patient is analyzed based on the electrical signal being input to a bit rate error (BER) estimator.

* * * * *